(12) United States Patent
Wilson et al.

(10) Patent No.: US 10,133,454 B2
(45) Date of Patent: Nov. 20, 2018

(54) STACKABLE PAGINATION INDICATORS

(71) Applicant: APPLE INC., Cupertino, CA (US)

(72) Inventors: Christopher Wilson, Cupertino, CA (US); Imran A. Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 442 days.

(21) Appl. No.: 14/503,131

(22) Filed: Sep. 30, 2014

(65) Prior Publication Data

US 2016/0018957 A1 Jan. 21, 2016

Related U.S. Application Data

(60) Provisional application No. 62/026,547, filed on Jul. 18, 2014.

(51) Int. Cl.
*G06F 3/0483* (2013.01)
*G06F 17/21* (2006.01)
*G06F 3/0482* (2013.01)
*G06F 3/0488* (2013.01)

(52) U.S. Cl.
CPC .......... *G06F 3/0483* (2013.01); *G06F 17/217* (2013.01); *G06F 3/0482* (2013.01); *G06F 3/04883* (2013.01)

(58) Field of Classification Search
None
See application file for complete search history.

(56) References Cited

U.S. PATENT DOCUMENTS

| 5,821,927 | A | * | 10/1998 | Gong | G06F 3/0481 |
| | | | | | 707/E17.12 |
| 6,448,987 | B1 | | 9/2002 | Easty et al. | |
| 7,036,091 | B1 | * | 4/2006 | Nguyen | G06F 3/0482 |
| | | | | | 348/E5.002 |
| 7,509,348 | B2 | | 3/2009 | Burtner et al. | |
| 9,508,108 | B1 | * | 11/2016 | Tavares | G06T 1/00 |
| 2004/0141012 | A1 | * | 7/2004 | Tootill | G06F 3/0482 |
| | | | | | 715/827 |

(Continued)

*Primary Examiner* — Jeffrey A Gaffin
*Assistant Examiner* — John M Heffington
(74) *Attorney, Agent, or Firm* — Morgan, Lewis & Bockius LLP

(57) ABSTRACT

Instead of displaying interface elements such as pagination indicators side-by-side on a display, a device can present such interface elements in other visible configurations relative to each other. For example, the device can display pagination indicators of different sizes stacked on top of each other. When such stacked pagination indicators are presented as viewed from directly overhead, the pagination indicators can be appear as concentric rings. Alternatively, the device can display such stacked pagination indicators from various different non-overhead angle perspectives. When shown at some of these angles, the stacked pagination indicators can appear as a three-dimensional stack of discs. The device can highlight a particular pagination indicator to distinguish that particular pagination indicator visibly from the other pagination indicators. The highlighted pagination indicator can serve to indicate which of several interface segments, such as pages, is currently being shown on the display.

34 Claims, 21 Drawing Sheets

(56) References Cited

U.S. PATENT DOCUMENTS

| | | | |
|---|---|---|---|
| 2007/0164989 A1* | 7/2007 | Rochford | G06F 3/0482 |
| | | | 345/156 |
| 2008/0040682 A1* | 2/2008 | Sorenson | G06F 3/04817 |
| | | | 715/777 |
| 2008/0228717 A1* | 9/2008 | Fein | G06F 17/30395 |
| 2011/0131533 A1* | 6/2011 | Ku | G06F 3/0482 |
| | | | 715/836 |
| 2011/0138313 A1* | 6/2011 | Decker | G06F 3/0481 |
| | | | 715/777 |
| 2012/0036434 A1* | 2/2012 | Oberstein | G06F 3/0482 |
| | | | 715/702 |
| 2012/0124520 A1* | 5/2012 | Samp | G06F 3/04886 |
| | | | 715/834 |
| 2013/0185642 A1 | 7/2013 | Gammons | |
| 2013/0246974 A1* | 9/2013 | Weisberg | G06F 3/04842 |
| | | | 715/834 |
| 2014/0047361 A1 | 2/2014 | Gaspar et al. | |
| 2014/0282143 A1* | 9/2014 | Matas | G06Q 50/01 |
| | | | 715/765 |
| 2016/0011726 A1* | 1/2016 | Felt | G06F 3/0482 |
| | | | 715/828 |

\* cited by examiner

STACKABLE PAGINATION INDICATORS

CLAIM OF PRIORITY

The present application claims priority under 35 U.S.C. § 119(e) to U.S. Patent Application Ser. No. 62/026,547, filed on Jul. 18, 2014, titled "3-D PAGING DOTS," the entire contents of which are incorporated by reference herein for all purposes.

BACKGROUND

The present disclosure relates to user interfaces, and more particularly to pagination indicators.

U.S. Patent Application Publication No. 2009/0064055 (Ser. No. 11/850,005), assigned to Apple, Inc., discloses a mobile device with a horizontally scrolling application menu on a touch-sensitive display. A touch-sensitive display can contain page indicator dots within a navigational region. The page indicator dots can provide context when navigating through different sections or pages of a user interface.

SUMMARY

A device can present user interface segment indicators in a variety of visible configurations relative to each other. For example, the device can display segment indicators of different sizes stacked on top of each other. When such stacked segment indicators are presented as viewed from directly overhead, the segment indicators can be appear as concentric rings. Alternatively, the device can display such stacked segment indicators from various different non-overhead angle perspectives. When shown at some of these angles, the stacked segment indicators can appear as a three-dimensional stack of discs. The device can highlight a particular segment indicator to distinguish that particular segment indicator visibly from the other segment indicators. The highlighted segment indicator can serve to indicate which of several interface segments, such as pages, is currently being shown on the display.

DETAILED DESCRIPTION

Figure 1:
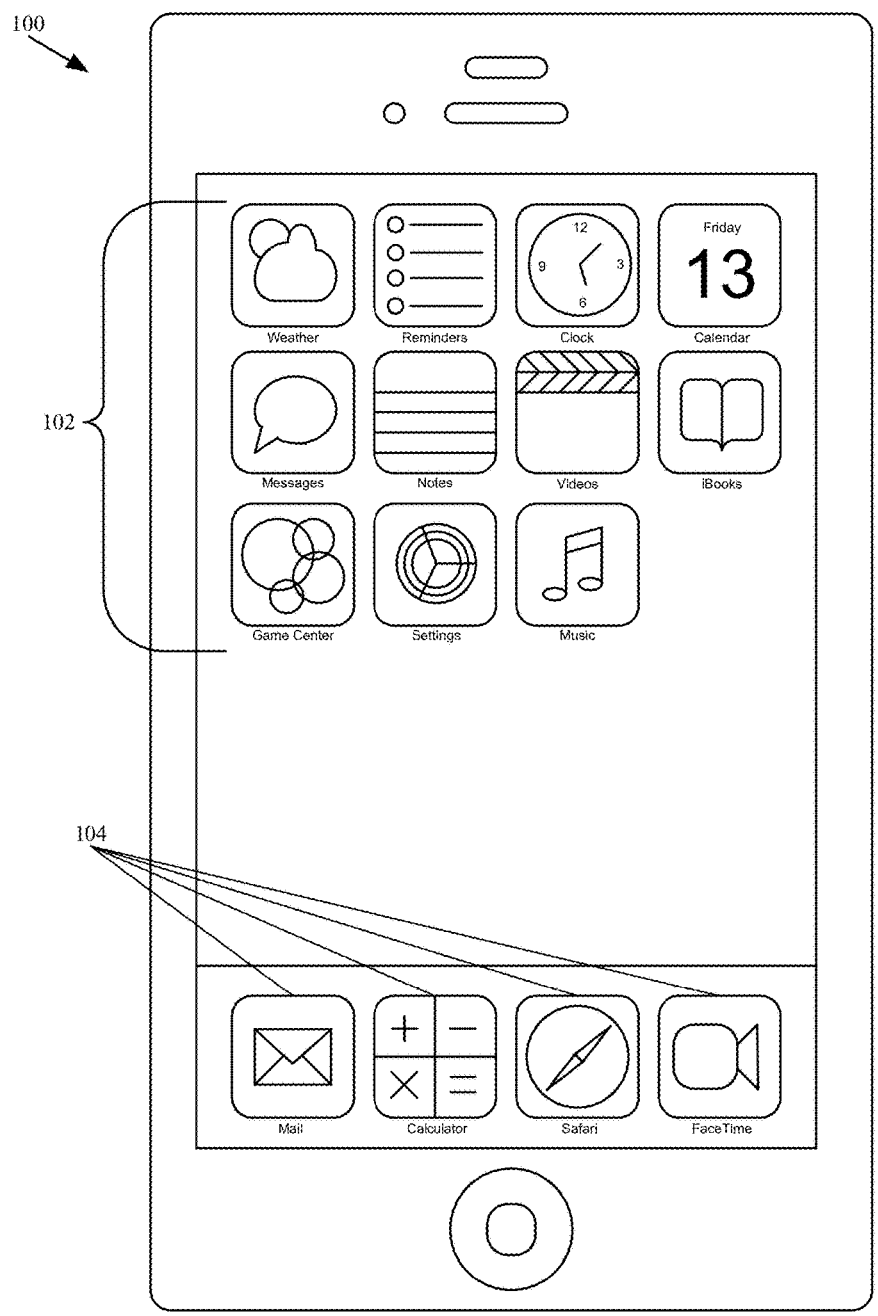
FIG. 1 is a diagram that illustrates an example of a mobile device having a touch-sensitive display that concurrently presents a scrollable section and a separate dock.

In the following description, for the purposes of explanation, specific details are set forth in order to provide a thorough understanding of embodiments of the invention. However, it will be apparent that various embodiments may be practiced without these specific details. The figures and description are not intended to be restrictive.

A multi-segment interface can involve an active segment that a device currently displays and one or more inactive segments that a device does not currently display. The phrases "active segment" and "inactive segment" are used herein. An "active segment" is a segment that is currently being displayed in full, without any portion thereof being obscured by other segments. In some embodiments, the device detects and responds to user interactions with interface elements within the active segment. In contrast, an "inactive segment" is a segment that is not currently being displayed in full, although parts of an inactive segment can be shown while other parts are obscured (e.g., by the active segment). In some embodiments, the device does not provide a user with opportunities to interact with interface elements contained in inactive segments while those segments remain inactive, although the device can detect and respond to user interactions that cause the device to make an inactive segment active. Pages and tabs are both types of segments.

Responsive to user input such as swiping gestures, the device can swap the statuses of a pair of these interface segments, causing the active interface segment to become inactive and causing an inactive segment to become active. In some examples discussed herein, the interface segments assume the form of pages, the active one of which can be displayed at any given moment. However, some embodiments can involve interface segments that are not pages, and which might be partially displayed and partially obscured while inactive. For example, the segments can be partially overlapping tabs within a series of tabs. Parts of inactive tabs can be visible even though those inactive tabs might be partially obscured by other tabs in the series.

Techniques and interfaces described herein can indicate, to a user of a device, which of several interface segments, such as pages, is currently being shown on the display of the mobile device. The device could be a mobile device such as a notebook computer or a smart phone. Alternatively, the device could be a desktop computer. The indicator of which interface segment is currently being shown—or, in other words, which interface segment is currently the "active" interface segment—can be a highlighted segment indicator (also referred to as an interface element) within a sequence of segment indicators that includes dots that at least partially overlap each other. The highlighted segment indicator can correspond to the currently active interface segment, while the other segment indicators can correspond to currently inactive interface segments. The position of the highlighted segment indicator within the sequence of segment indicators can serve to indicate the position of the currently active interface segment within a sequence of interface segments.

Instead of displaying the segment indicators in a side-by-side configuration, a device can present the segment indicators in a configuration in which one or more of the segment indicators at least partially overlap others of the segment indicators. The segment indicators can be of different sizes. The device can display the segment indicators in a stack. The device can display the stack from different angles and perspectives, such as an overhead perspective or a three-dimensional non-overhead perspective. Various different embodiments are discussed further below.

Device with Multi-Segmented Interface

Many devices are equipped with a touch-sensitive display that permits a user to contact a location on the display in order to make a selection or make a gesture. Some devices are capable of detecting, through the touch-sensitive display, more complex gestures that can be assigned different meanings. Such gestures can include single taps, double taps, holds, swipes, drags, pinches, rotations, etc. Gestures can be input using one or contact points. For example, gestures can be input using one or several of the user's fingers. For example, a device may interpret a single-tap at the location of a particular icon as indicating the user's intent to launch (e.g., execute or open) a particular application to which that particular icon corresponds. In many examples described herein, a touch-sensitive display is used as an example of a mechanism through which a device can receive user input. However, in any of the embodiments discussed herein, such a touch-sensitive display could be replaced by any input device capable of detecting inputs from the user, such as, for example, requests to navigate through a user interface, working in concert with a display capable of displaying responses to the requests to navigate through the user interface. Additionally, in many situations described herein, a contact (or, alternatively, a gesture) is described as being detected at a location in the user interface. However, in any of these situations, a different input device capable of detecting an interaction with a position that corresponds to the location in the user interface could be used instead of or in addition to the touch-sensitive display. Such interactions with different input devices can include, for example, interaction with a mouse or trackpad while a cursor is at or near the location, or an eye tracking camera that indicates that a point of gaze is at or near the location, or audio inputs.

Because the display sizes of some devices are made relatively small to enable portability, and because icons are preferably large enough in size to enable a user to identify the applications that they represent, the quantity of icons that can be displayed or presented concurrently on a device's display sometimes can be fairly limited. Nevertheless, a device often will be capable of storing numerous applications—more than can be represented by icons on a single screen. Additionally or alternatively, a device can be capable of presenting user interface elements representative of links to web applications, web page bookmarks, widgets, etc. In order to permit a user to access all of these numerous applications and other features, a device's user interface can be segmented into multiple separate screens. Each such screen can contain a different subset of all of the icons for the applications and other features stored on the device. Thus, the user interface can be a multi-segmented interface, in which each segment of that interface is a separate screen or page.

A device can present one such page at a time on its display. The display could be a touch-sensitive display that enables the device to detect user contact on that display. Alternatively, the device can include a user input mechanism such as a touch-sensitive surface, mouse, track ball, etc. The device can detect user interaction through any of these user input mechanisms, and can modify displayed content responsively and accordingly. In some embodiments, the pages can be sequentially related to each other, such that one page optionally and logically precedes or follows another page in a set order. For example, in response to detecting a left or right swipe gesture relative to a touch-sensitive surface, the device can cause a currently obscured, or "inactive," page preceding or following the currently presented, or "active," page to be presented instead, effectively swapping between pages of application-representing icons. The user interface therefore can present the currently active page or segment's icons within a "scrollable section" of the interface.

Under some circumstances, some of the applications stored on a device might be accessed much more frequently than other applications. A user of the device might wish to be able to launch these frequently accessed applications quickly. If the device is currently presenting a page (i.e., the currently active page) other than the one that contains the icon for the application that the user wishes to launch, then the user might find it inconvenient to be required to scroll through potentially multiple different pages in a hunt for the icon of interest. In order to allow a user to launch frequently used applications regardless of the graphical interface page that is currently being presented, a device can present, concurrently with the scrollable section, a section of the screen that remains constant throughout the page-swapping activity described above. This section is sometimes called the "dock."

There are various ways in which a dock can be distinguished from the remainder of the display. For example, in some embodiments, the dock can be distinguished from the remainder of the display through a difference in coloration or shading. The dock typically occupies a fraction of the display—usually large enough to contain a single row of icons. Often, the dock is shown at the bottom of a device's display. Icons on a page can be added to a dock using one or more gestures. A user of the device can also remove icons from the dock. For example, in response to detecting dragging gestures, a device can move icons from the scrollable section into the dock or from the dock back onto the scrollable section. When the device swaps the page that is currently being displayed, the icons contained in the dock can remain in place even while other icons move off of and onto the display. In this manner, icons in the dock are quickly accessible regardless of which of the pages of the user interface is currently being presented within the scrollable section.

FIG. 1 is a diagram that illustrates an example of a device 100 having a touch-sensitive display that concurrently presents a scrollable section and a separate dock. Device 100 can be a smart phone such as an Apple iPhone®, for example. Alternatively, device 100 could be a desktop computer or a tablet computing device such as an Apple iPad®. Device 100 can have a display that shows application icons 102 in a scrollable section of the operating system user interface. On this display, device 100 can additionally show application icons 104 in a dock of the operating system user interface. By detecting single-taps and double-taps relative to application icons 102 and 104, the operating system of device 100 can execute, or launch (e.g., start processes for), corresponding applications that are stored within the persistent memory of device 100, and automatically send single-tap or double-tap signals (depending on the type of tap detected) to those applications.

Figure 2:
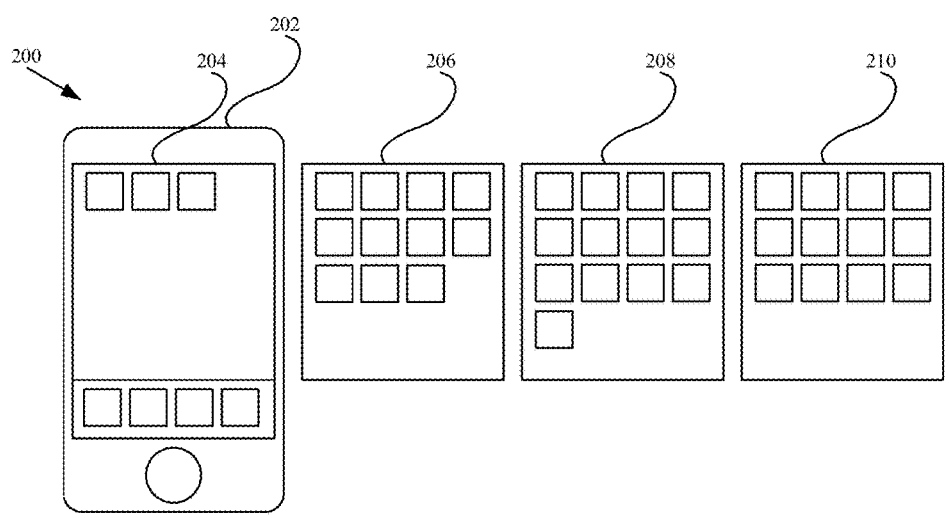
FIG. 2 is a diagram that illustrates an example of a device that has a multi-segmented operating system interface.

FIG. 2 is a diagram that illustrates an example 200 of a device 202 that has a multi-segmented operating system interface. The multi-segmented operating system interface includes virtual pages 204, 206, 208, and 210. Each such virtual page is a separate segment of the interface. According to some embodiments, device 202 displays only one of the virtual pages at a time; in the embodiment depicted in FIG. 2, virtual page 204 is currently selected for display by a user of device 202. Thus, in the example illustrated, page 204 is currently active, while pages 206, 208, and 210 are currently inactive.

The user of device 202 can instruct device 202 to display different ones of pages 204, 206, 208, and 210 at different moments in time, typically in response to detecting gestures made relative to a touch-sensitive surface (e.g., touchscreen) of device 202. Thus, the currently active page can become inactive (i.e., not be displayed), while a currently inactive page can become active (i.e., be the page displayed by device 202). In response to certain user gestures (e.g., a tap and hold on an icon followed by a dragging input performed with the same contact), device 202 optionally moves a user interface element (e.g., an application icon or other graphical widget) from one page to another page.

As is discussed above, device 202 can be configured to maintain, on its display, the icons in the dock even when changing the presentation of the currently active page to a different one of pages 204, 206, 208, and 210. Although most of the icons on the previously active page are, optionally, replaced on the display by the icons on the newly active page after such a change, the icons in the dock remain constant throughout the change.

Pagination Dots Generally

Figure 3:
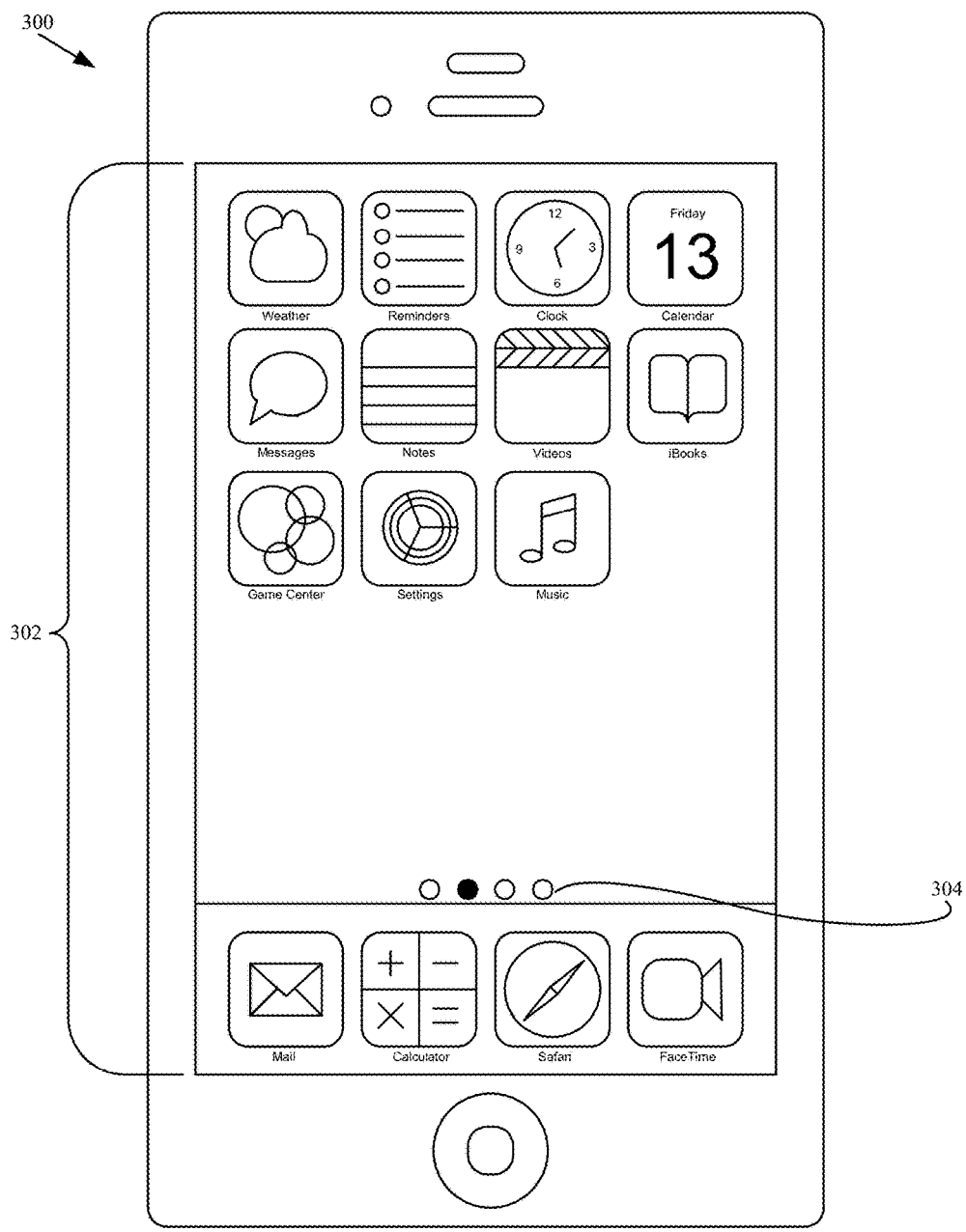
FIG. 3 is a diagram that illustrates an example of a graphical interface in which a position of a currently active interface segment within a sequence of interface segments can be indicated through the use of pagination dots as segment indicators.

As is discussed above, in some embodiments, a particular page in a set of pages may be active at a time. Pages and tabs are examples of interface segments that can occur in a multi-segment user interface. FIG. 3 is a diagram that illustrates an example 300 of a graphical interface 302 in which a position of a currently active interface segment within a sequence of interface segments can be indicated through the use of pagination dots. As shown, pagination dots 304 include one dot that is filled-in or otherwise highlighted, along with other dots that are not filled-in or otherwise highlighted. The highlighted dot is thus visually distinguishable from the non-highlighted dots. Although four pagination dots 304 are shown in this example, different quantities of dots can be displayed.

The quantity of pagination dots 304 is generally representative of the quantity of pages that are contained within the multi-segmented interface. Each of pagination dots 304 is representative of a different page. Some or all of the pages optionally include one or more application icons. The currently highlighted dot indicates, at the bottom of interface 302, which of the several pages of application icons is currently being presented and is active.

Addition of a new application icon to the multi-segmented interface can cause a new page to be created in the multi-segmented interface, and for the new application icon to be added to the newly created page. The creation of a new page also can cause a new pagination dot to be added to pagination dots 304. Conversely, the removal of the last application icon from a particular page of the multi-segmented interface can cause that particular page to be deleted, along with its representative one of pagination dots 304. The rearrangement of icons also could cause a page to be added or deleted. For example, if an icon is moved off of its current page to an existing or new page, that could cause a page to be added or deleted.

While the device is presenting a currently active page, the device can detect a leftward or rightward swiping gesture made by a user in the scrollable area. The detection of this swiping gesture can cause the device to change which page of application icons is currently being presented in interface 302. The device's presentation of a different page of application icons in this manner also can cause the device to highlight a different one of pagination dots 304 corresponding to that different page in order to signify which of the pages is currently being presented.

For example, if the device is currently presenting the second of four pages in interface 302, then the device's detection of a rightward swiping gesture can cause the device (a) to move the second of the four pages rightward out of bounds of the display and (b) to move the first of the four pages rightward virtually from beyond the display into the bounds of the display. This gesture can also cause the device to remove the highlighting from the second of pagination dots 304 and to add highlighting to the first of pagination dots 304 corresponding to the first page, signifying that the first of the four pages of application icons is now the currently active page.

For another example, if the device is currently presenting the first of four pages in interface 302, then the device's detection of a leftward swiping gesture can cause the device (a) to move the first of the four pages leftward out of bounds of the display and (b) to move the second of the four pages leftward virtually from beyond the display into the bounds of the display. This gesture can also cause the device to remove the highlighting from the first of pagination dots 304 and to add highlighting to the second of pagination dots 304, signifying that the second of the four pages of application icons is now the currently active page.

In some embodiments, the device might not reveal pagination dots 304 until there is more than one page of application icons in the multi-segmented interface. According to one technique, the device might reveal pagination dots 304 in response to prospective creation of the second page through the addition of a new application icon to the multi-segmented interface. Beneficially, the pagination model illustrated in connection with FIG. 3 permits a very large quantity of application icons to be added to the multi-segmented interface.

Overhead Concentric Ring View of Stacked Segment Indicators

Figure 4:
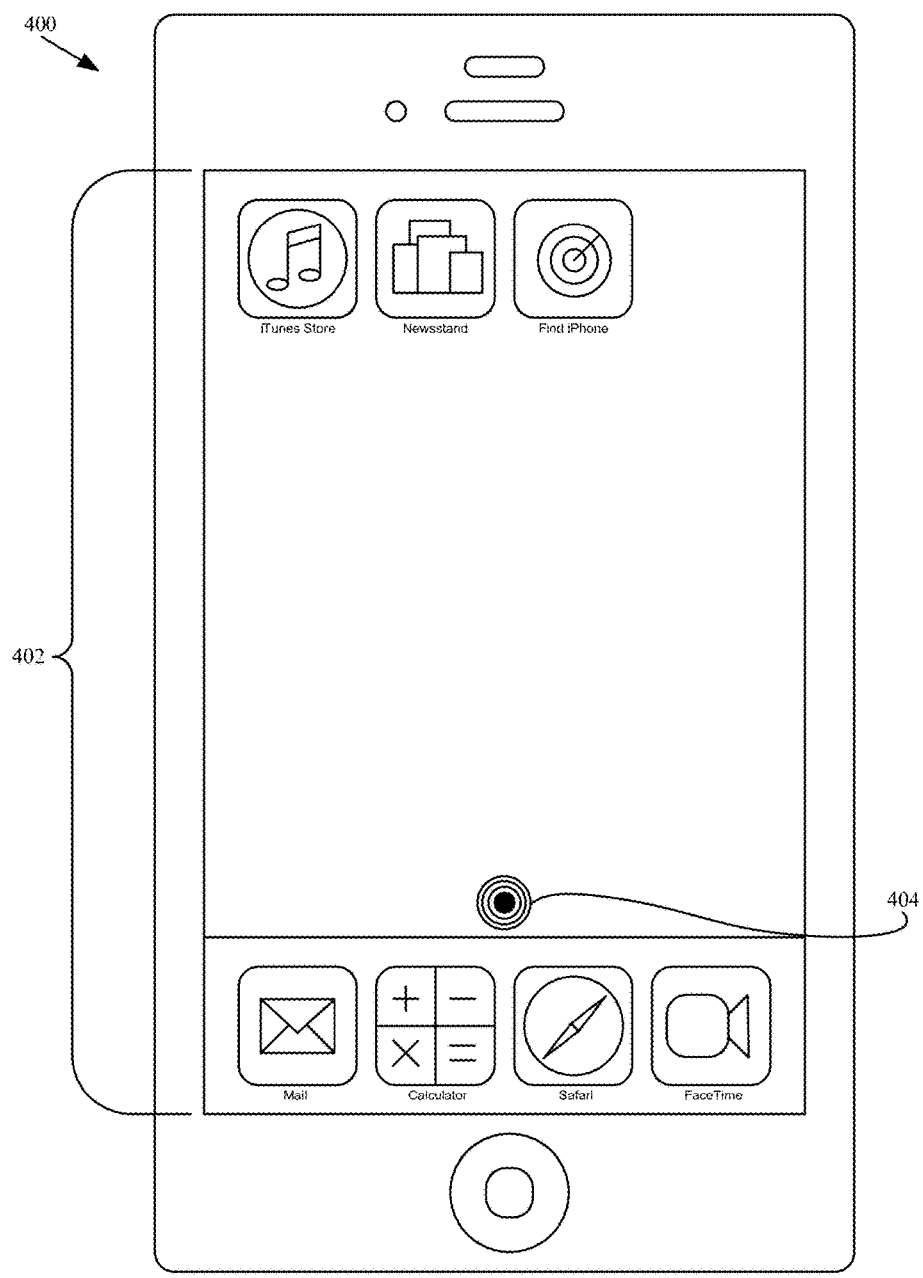
FIG. 4 is a diagram that illustrates an example of a graphical interface in which a position of a currently active interface segment within a sequence of interface segments can be indicated through an overhead view of stacked segment indicators appearing as concentric rings, according to some embodiments.

FIG. 4 is a diagram that illustrates an example 400 of a graphical interface 402 in which a position of a currently active interface segment within a sequence of interface segments can be indicated through an overhead view of stacked segment indicators appearing as concentric rings, according to some embodiments. As shown, segment indicators 404 include an indicator that is filled-in or otherwise highlighted, along with other indicators that are not filled-in or otherwise highlighted. Although four concentric segment indicators 404 are shown in this example, different quantities of indicators can be displayed.

As shown in FIG. 4, some of segment indicators 404 overlap and contain each other. For example, in FIG. 4, a smaller central segment indicator overlaps the central portion of a larger segment indicator, which itself overlaps a central portion of a still larger segment indicator. The larger segment indicators contain the smaller segment indicators. The central segment indicator is currently highlighted, indicating that a first page in a sequence of four pages is the currently active page being displayed in interface 402. Through the highlighting, the central segment indicator is visually distinguished from others of segment indicators. Highlighting can be performed in a variety of ways, such as by shading, using a different color, etc. Other techniques for visually distinguishing segment indicators can alternatively be used. The other three pages are currently inactive and not displayed in interface 402. The quantity of segment indicators 404 indicates the quantity of pages (or segments) in the multi-segmented interface.

Each segment indicator of segment indicators 404 can be conceptualized as a segment indicator of a different size than the other segment indicators. These segment indicators can be conceptualized as being stacked one on top of the other, with the largest segment indicator at the bottom of the stack, and the smallest segment indicator at the top of the stack. Following this conceptualization, the segment indicators shown in FIG. 4 are being shown from a directly overhead perspective.

Figure 5:
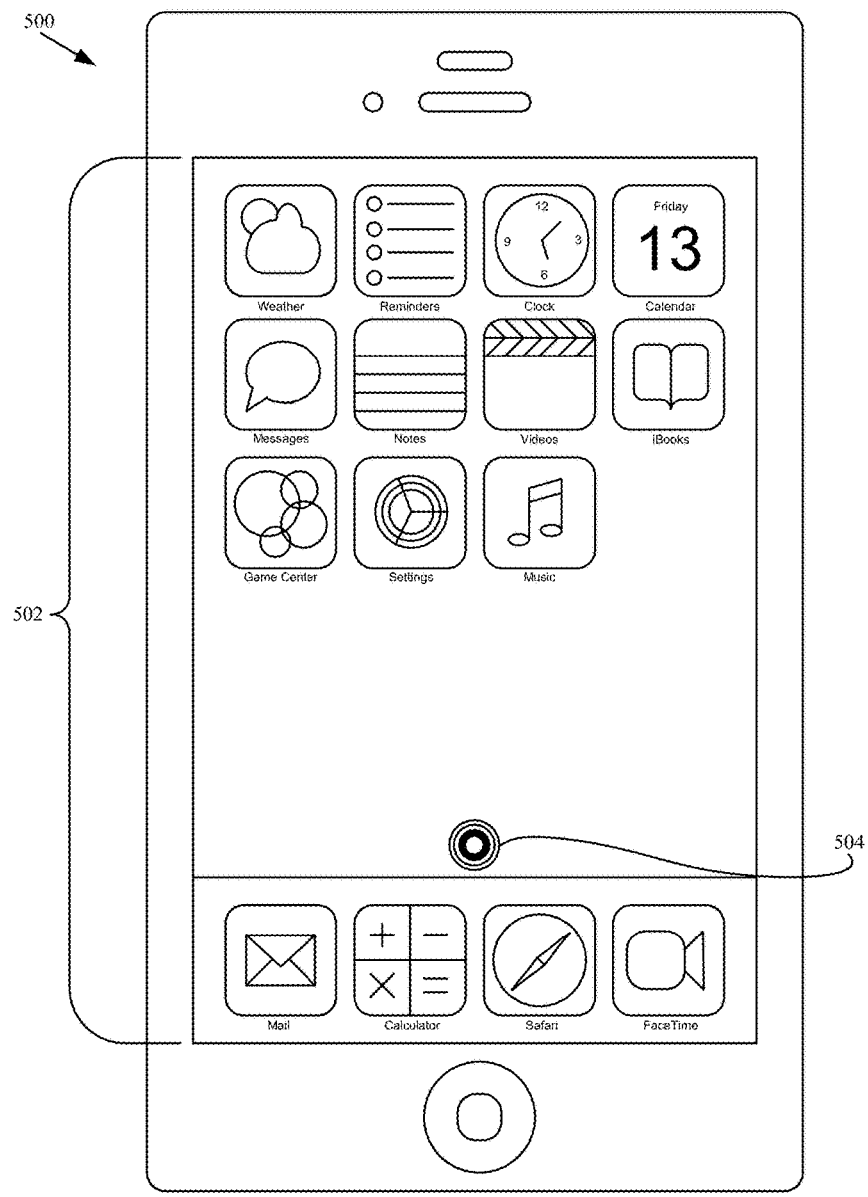
FIG. 5 is a diagram that illustrates an example of a graphical interface in which a different ring in a set of concentric rings has become highlighted, according to some embodiments.

FIG. 5 is a diagram that illustrates an example 500 of a graphical interface 502 in which a different ring in a set of concentric rings has become highlighted, according to some embodiments. Similar to segment indicators 404 of FIG. 4, segment indicators 504 are shown as a series of concentric rings. However, unlike in FIG. 4, in which the central indicator was highlighted in order to indicate that the first of four pages was currently active, FIG. 5 shows that the second-to-innermost indicator of segment indicators 504 is highlighted. The highlighting of the second-to-innermost indicator indicates that the second of the four pages is the currently active page.

In some embodiments, such as is illustrated in FIG. 5, one of segment indicators 504 can be highlighted at any given moment in time, while the others of segment indicators remain un-highlighted. In some such embodiments, the indicators inside or on top of or contained within the highlighted indicator remain un-highlighted. In some such embodiments, the indicators outside of or beneath or uncontained by the highlighted indicator also remain un-highlighted. However, some embodiments can follow different highlighting schemes that nevertheless distinguish currently active pages from currently inactive pages.

Figure 6:
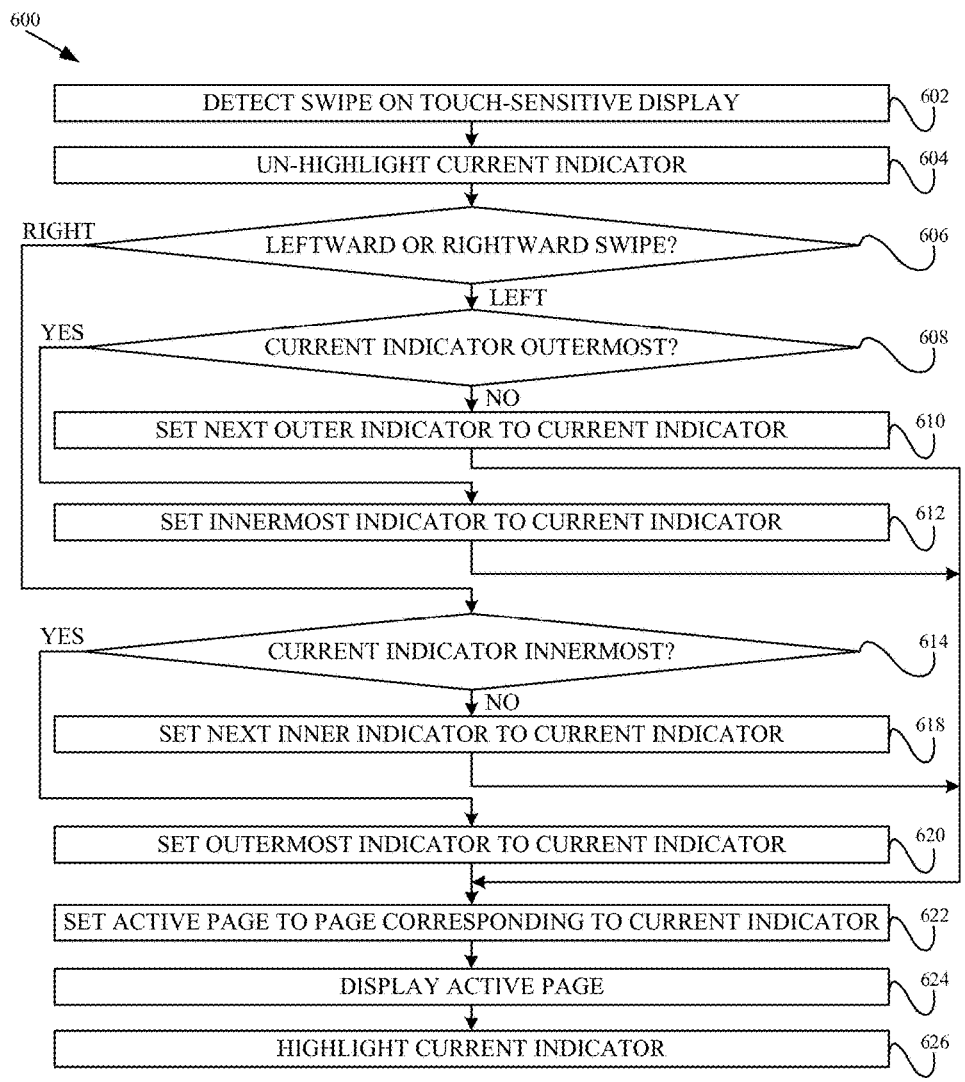
FIG. 6 is a flow diagram that illustrates an example of a technique for modifying the highlighting of a concentric segment indicator and displaying a different virtual page in response to a swiping gesture, according to some embodiments.

FIG. 6 is a flow diagram that illustrates an example 600 of a technique for modifying the highlighting of a concentric segment indicator and displaying a different page in response to a swiping gesture, according to some embodiments. Although the example technique involves operations being performed in a specific order, variants of the technique according to some embodiments can involve these or different operations being performed in different orders.

In block 602, the device detects a swiping gesture on its touch-sensitive surface. In block 604, in response to detecting the swiping gesture, the device un-highlights the current segment indicator. In block 606, the device determines whether the swiping gesture was directed leftward or rightward. In the case of a leftward swipe, the device makes a subsequent determination in block 608. In the case of a rightward swipe, the device makes a subsequent determination in block 614.

In block 608, in response to determining that the swiping gesture was directed leftward, the device determines whether the current segment indicator is the outermost indicator in the set of concentric segment indicators. If so, then the device sets the current segment indicator in block 612. Otherwise, the device sets the current segment indicator in block 610.

In block 610, in response to determining that the current segment indicator is not the outermost indicator, the device sets the current segment indicator to be the next outer segment indicator in the set of concentric segment indicators. The device then sets the active page in block 622.

Alternatively, in block 612, in response to determining that the current segment indicator is the outermost indicator, the device sets the current segment indicator to be the innermost segment indicator in the set of concentric segment indicators. In this way, the sequence of segment indicators can "loop around" from the outermost to the innermost indicator. The device then sets the active page in block 622.

Alternatively, in block 614, in response to determining that the swiping gesture was directed rightward, the device determines whether the current segment indicator is the innermost indicator in the set of concentric segment indicators. If so, then the device sets the current segment indicator block 620. Otherwise, the device sets the current segment indicator in block 618.

In block 618, in response to determining that the current segment indicator is not the innermost indicator in the set of concentric segment indicators, the device sets the current segment indicator to be the next inner segment indicator in the set of concentric segment indicators. The device then sets the active page in block 622.

Alternatively, in block 620, in response to determining that the current segment indicator is the innermost indicator in the set of concentric segment indicators, the device sets the current segment indicator to be the outermost segment indicator in the set of concentric segment indicators. In this way, the sequence of segment indicators can "loop around" from the innermost to the outermost indicator. The device then sets the active page in block 622.

In block 622, the device sets the active page to be the page that corresponds to the current segment indicator. In block 624, the device displays the active page. In block 626, the device highlights the current segment indicator.

Figure 7:
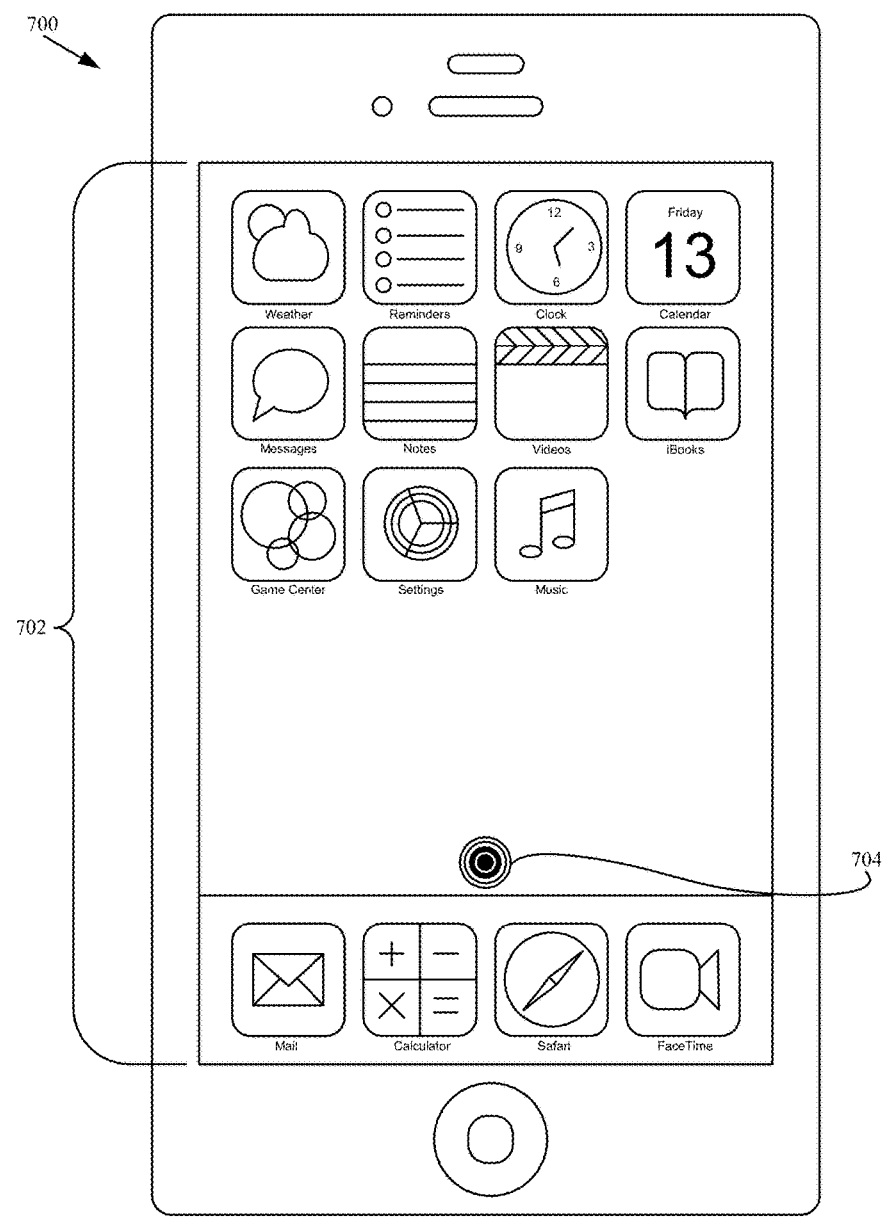
FIG. 7 is a diagram that illustrates an example of a graphical interface in which multiple rings in a set of concentric rings are concurrently highlighted, according to some embodiments.

FIG. 7 is a diagram that illustrates an example 700 of a graphical interface 702 in which multiple rings in a set of concentric rings are concurrently highlighted, according to some embodiments. Similar to segment indicators 504 of FIG. 5, segment indicators 704 are shown as a series of concentric rings. However, unlike in FIG. 5, in which only the second-to-innermost indicator was highlighted, FIG. 7 shows both the innermost and second-to-innermost indicator being concurrently highlighted. In spite of multiple indicators of segment indicators 704 being highlighted concurrently, segment indicators 704 similarly indicate that the second of the four pages is the currently active page.

In some embodiments, such as is illustrated in FIG. 7, several of segment indicators 704 can be highlighted at any given moment in time, while the others of segment indicators remain un-highlighted. In some such embodiments, the particular indicator corresponding to the currently active page, as well as the indicators inside or on top of or contained within that particular indicator, are highlighted. In some such embodiments, the indicators outside of or beneath or uncontained by that particular indicator remain un-highlighted. Visible demarcations between segment indicators 704 can be, but do not necessarily need to be, displayed. For example, such visible demarcations can include extra space between segment indicators, dotted lines showing boundaries between segment indicators, different shadings or colors of the segment indicators, etc.

Figure 8:
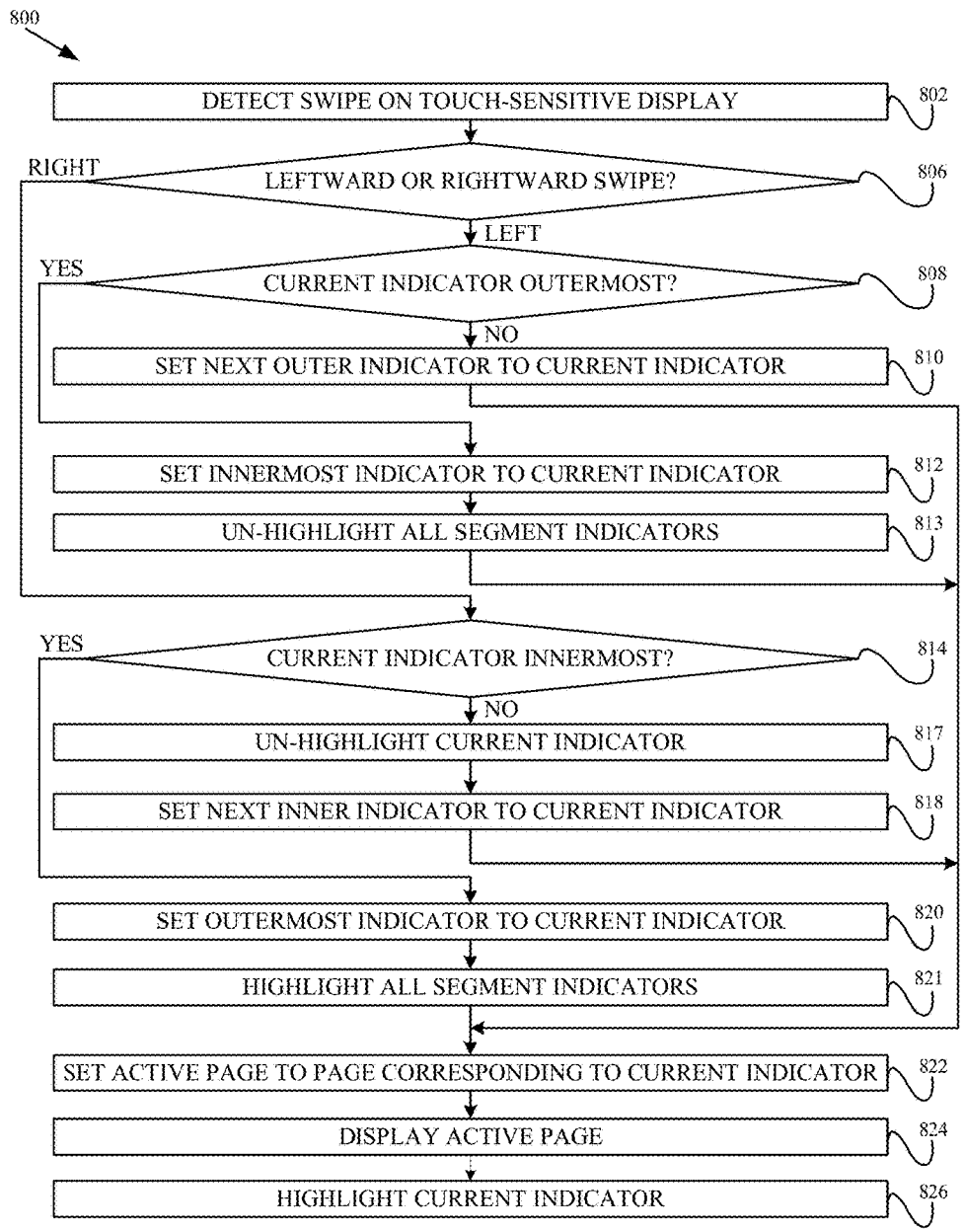
FIG. 8 is a flow diagram that illustrates an example of a technique for concurrently highlighting multiple concentric segment indicators and displaying a different virtual page in response to a swiping gesture, according to some embodiments.

FIG. 8 is a flow diagram that illustrates an example 800 of a technique for concurrently highlighting multiple concentric segment indicators and displaying a different page in response to a swiping gesture, according to some embodiments. Although the example technique involves operations being performed in a specific order, variants of the technique according to some embodiments can involve these or different operations being performed in different orders.

In the example illustrated in FIG. 8, whenever a concentric segment indicator is highlighted, all of the segment indicators within that segment indicator are also highlighted.

In block 802, the device detects a swiping gesture on its touch-sensitive surface. In block 806, the device determines whether the swiping gesture was directed leftward or rightward. In the case of a leftward swipe, the device makes a subsequent determination in block 808. In the case of a rightward swipe, the device makes a subsequent determination in block 814.

In block 808, in response to detecting a rightward swipe, the device determines whether the current segment indicator is the outermost indicator in the set of concentric segment indicators. If so, then the device sets the current segment indicator in block 812. Otherwise, the device sets the current segment indicator in block 810.

In block 810, in response to determining that the current segment indicator is not the outermost indicator in the set of concentric segment indicators, the device sets the current segment indicator to be the next outer segment indicator in the set of concentric segment indicators. The previously current segment indicator can remain highlighted. The device then sets the active page in block 822.

Alternatively, in block 812, in response to determining that the current segment indicator is the outermost indicator in the set of concentric segment indicators, the device sets the current segment indicator to be the innermost segment indicator in the set of concentric segment indicators. In this way, the sequence of segment indicators can "loop around" from the outermost to the innermost indicator. In block 813, the device un-highlights all of the segment indicators. The device then sets the active page in block 822.

Alternatively, in block 814, in response to detecting a leftward swipe, the device determines whether the current segment indicator is the innermost indicator in the set of concentric segment indicators. If so, then the device sets the current segment indicator in block 820. Otherwise, the device un-highlights the current segment indicator block 817.

In block 817, in response to determining that the current segment indicator is not the innermost indicator in the set of concentric segment indicators, the device un-highlights the current segment indicator. In block 818, the device sets the current segment indicator to be the next inner segment indicator in the set of concentric segment indicators. The device then sets the active page in block 822.

Alternatively, in block 820, in response to determining that the current segment indicator is the innermost indicator in the set of concentric segment indicators, the device sets the current segment indicator to be the outermost segment indicator in the set of concentric segment indicators. In this way, the sequence of segment indicators can "loop around" from the innermost to the outermost indicator. In block 821, the device highlights all of the segment indicators. The device then sets the active page in block 822.

In block 822, the device sets the active page to be the page that corresponds to the current segment indicator. In block 824, the device displays the active page. In block 826, the device highlights the current segment indicator.

Overhead Concentric Polygonal View of Segment Indicators

Figure 9:
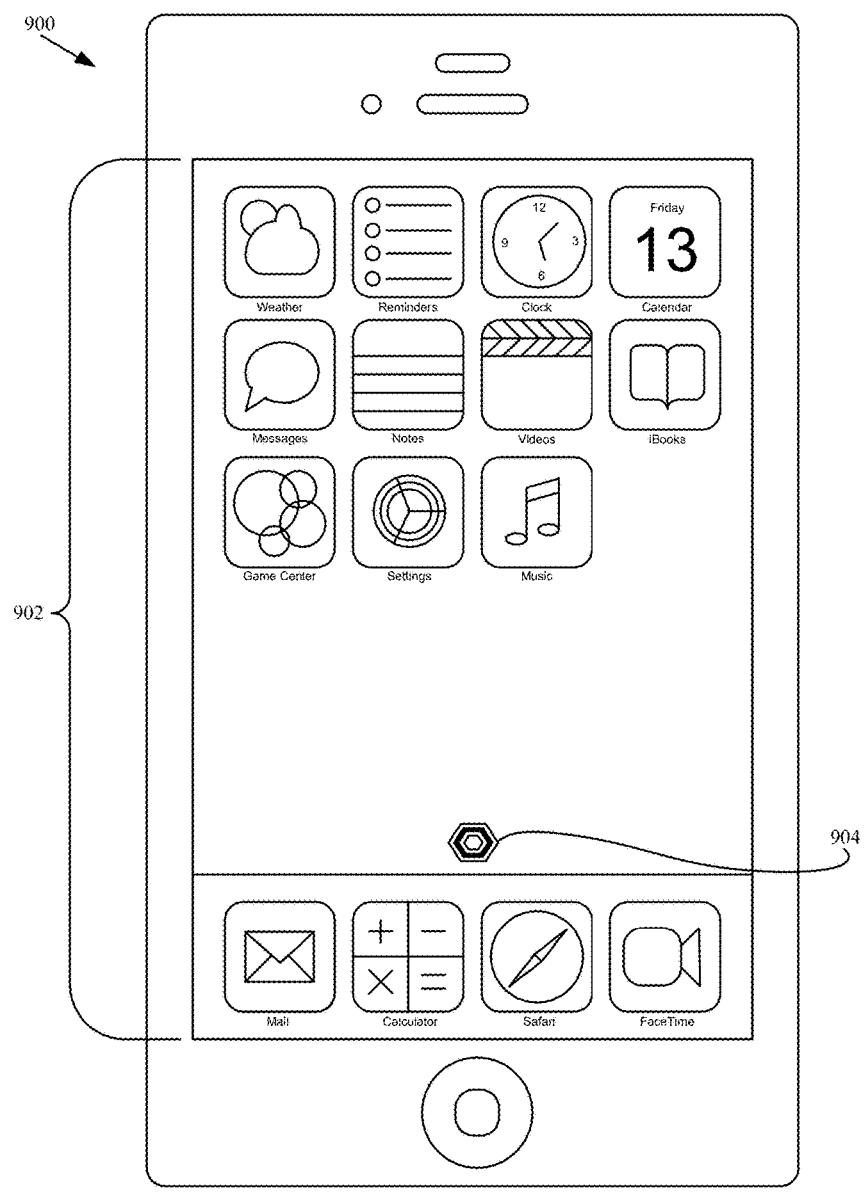
FIG. 9 is a diagram that illustrates an example of a graphical interface in which a position of a currently active interface segment within a sequence of interface segments can be indicated through an overhead view of stacked segment indicators appearing as concentric polygons, according to some embodiments.

Certain embodiments involving circular segment indicators, such as dots, are discussed above. However, some embodiments can involve segment indicators that are shapes other than circles. For example, the segment indicators can be concentric polygons such as hexagons. FIG. 9 is a diagram that illustrates an example 900 of a graphical interface 902 in which a position of a currently active interface segment within a sequence of interface segments can be indicated through an overhead view of stacked segment indicators appearing as concentric polygons, according to some embodiments. As shown, segment indicators 904 include an indicator that is filled-in or otherwise highlighted, along with other indicators that are not filled-in or otherwise highlighted. Although four concentric segment indicators 904 are shown in this example, different quantities of indicators can be displayed.

As shown in FIG. 9, some of segment indicators 904 overlap and contain each other. The second-to-outermost segment indicator is currently highlighted, indicating that a third page in a sequence of four pages is the currently active page being displayed in interface 902. The other three pages are currently inactive and not displayed in interface 902. The quantity of segment indicators 904 indicates the quantity of pages (or segments) in the multi-segmented interface.

Each segment indicator of segment indicators 904 can be conceptualized as a segment polygon of a different size than the other segment polygons. These segment polygons can be conceptualized as being stacked one on top of the other, with the largest segment polygon at the bottom of the stack, and the smallest segment polygon at the top of the stack. Following this conceptualization, the segment polygons shown in FIG. 9 are being shown from a directly overhead perspective. In some embodiments, the shapes of the segment indicators can be variable and can be selected by a user from a set of candidate shapes.

Variable Perspective View of Stacked Segment Indicators

Certain embodiments involving a direct overhead view of stacked segment indicators are discussed above. However, some embodiments can involve views of stacked segment indicators from non-overhead perspectives. For example, a stack of segment indicators can be viewed from a perspective that is intermediate between a direct overhead view of the stack and a direct side view of the stack. Viewed from such a perspective, the stack can appear to be more three-dimensional than when viewed from directly overhead.

Figure 10:
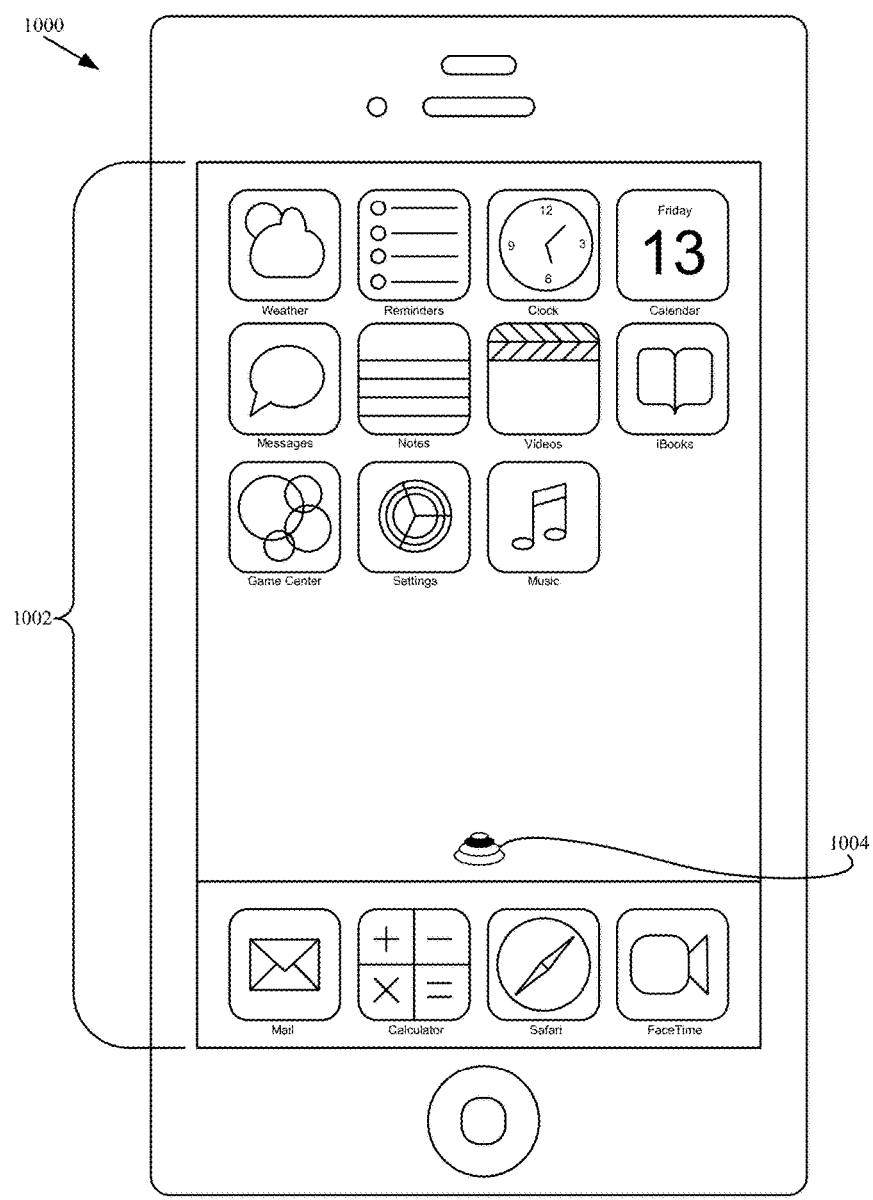
FIG. 10 is a diagram that illustrates an example of a graphical interface in which a position of a currently active interface segment within a sequence of interface segments can be indicated through a non-overhead perspective view of stacked segment indicators, according to some embodiments.

FIG. 10 is a diagram that illustrates an example 1000 of a graphical interface 1002 in which a position of a currently active interface segment within a sequence of interface segments can be indicated through a non-overhead perspective view of stacked segment indicators, according to some embodiments. As shown, segment indicators 1004 include an indicator that is filled-in or otherwise highlighted, along with other indicators that are not filled-in or otherwise highlighted. Although four concentric segment indicators 1004 are shown in this example, different quantities of indicators can be displayed.

According to some embodiments, a device can detect specified types of user interaction with a stack of segment indicators and can responsively modify the angle or perspective from which the stack of segment indicators is presented. For example, in some embodiments, while the device is presenting a stack of segment indicators in the directly overhead view illustrated in FIG. 5, the device can detect that user contact against the device's touch-sensitive surface has been established and continuously maintained at a location at (or corresponding to a location to) which the stack of segment indicators is displayed. In response to this continuously maintained contact, the device can rotate the presentation of the stack of segment indicators from the directly overhead view shown in FIG. 5 to the non-overhead perspective view shown in FIG. 10. The device can animate the rotation so that the perspective from which the stack of segment indicators is viewed appears to change gradually.

Conversely, while the device is presenting a stack of segment indicators in the non-overhead perspective view illustrated in FIG. 10, the device can detect that user contact against the device's touch-sensitive surface has been established and continuously maintained at a location at (or corresponding to a location to) which the stack of segment indicators is displayed. In response to this continuously maintained contact, the device can move the segment indicators apart on the screen (e.g., by rotating the presentation of the stack of segment indicators from the the non-overhead perspective view shown in FIG. 10 to the directly overhead view shown in FIG. 5). Again, the device can animate the rotation so that the perspective from which the stack of segment indicators is viewed appears to change gradually. Thus, in response to detecting specified user gestures, the device can toggle between perspectives with which the stack of segment indicators are presented.

Figure 11:
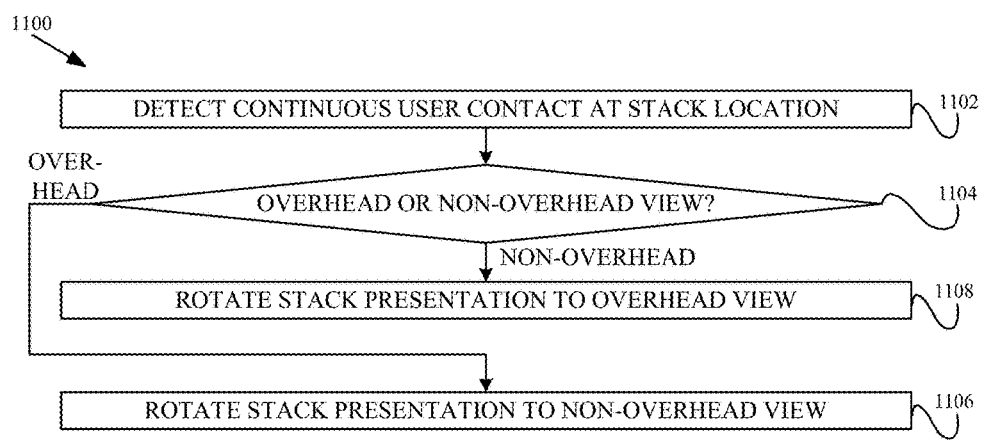
FIG. 11 is a flow diagram that illustrates an example of a technique for alternating an apparent perspective from which a stack of segment indicators is presented from a direct overhead view to a non-overhead perspective view and vice-versa, according to some embodiments.

FIG. 11 is a flow diagram that illustrates an example 1100 of a technique for alternating an apparent perspective from which a stack of segment indicators is presented from a direct overhead view to a non-overhead perspective view and vice-versa, according to some embodiments. Although the example technique involves operations being performed in a specific order, variants of the technique according to some embodiments can involve these or different operations being performed in different orders.

In block 1102, a device detects that user contact has been continuously maintained, for at least a specified threshold amount of time (e.g., 1 second, 2 seconds, etc.), at a location on a touch-sensitive surface corresponding to a display location at which a stack of segment indicators is presented. In block 1104, the device determines whether the apparent perspective with which the stack of segment indicators is being presented is a direct overhead view or a non-overhead perspective view. If the apparent perspective with which the stack of segment indicators is being presented is a direct overhead view, then the mobile device rotates the presentation in block 1106. Alternatively, if the apparent perspective with which the stack of segment indicators is being presented is a non-overhead perspective view, then the mobile device rotates the presentation in block 1108.

In block 1106, in response to determining that apparent perspective with which the stack of segment indicators is being presented is a direct overhead view, the device gradually rotates the presentation of the stack of segment indicators from the direct overhead view (as illustrated in FIG. 5) to the non-overhead perspective view (as illustrated in FIG. 10).

Alternatively, in block 1108, the device gradually rotates the presentation of the stack of segment indicators from the non-overhead perspective view (as illustrated in FIG. 10) to the direct overhead view (as illustrated in FIG. 5).

Figure 20:
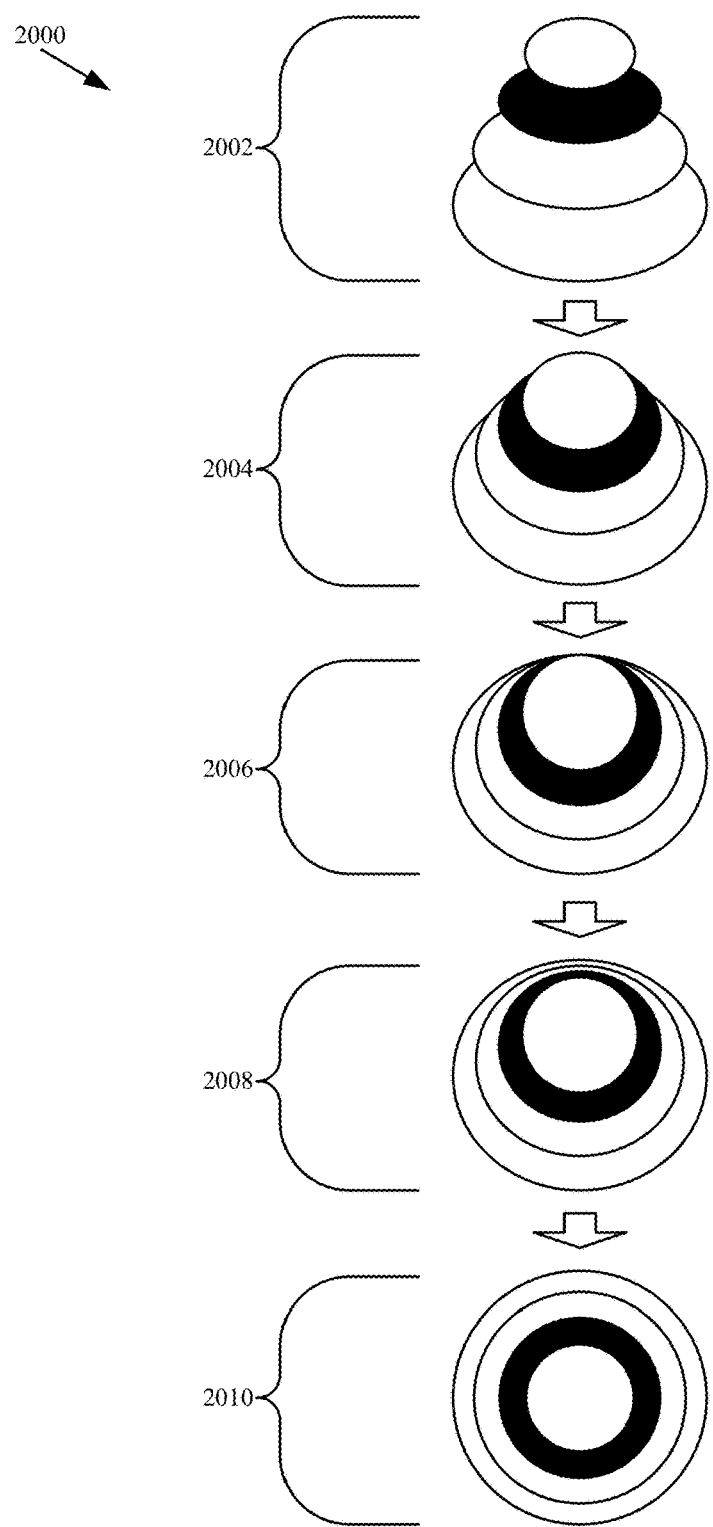
FIG. 20 is a diagram that illustrates an example of the gradual rotation of a presentation of a stack of segment indicators from a non-overhead perspective view to a direct overhead view, according to some embodiments.

FIG. 20 is a diagram that illustrates an example 2000 of the gradual rotation of a presentation of a stack of segment indicators from a non-overhead perspective view to a direct overhead view, according to some embodiments. Initially, a device can display the stack in a non-overhead perspective view 2002. The device can gradually rotate the stack to a more overheard view 2004. The device can further rotate the stack to an even more overhead view 2006. The device can then rotate the stack more to a nearly overhead view 2008. The device can finally rotate the stack to a direct overhead view 2010.

In some embodiments, the device can present the stack of segment indicators from the direct overhead view while user contact is not being maintained against the touch-sensitive surface location corresponding to a display location at which the stack is being presented. In some such embodiments, while user contact is being maintained against that surface location, the device can present the stack of segment indicators from the non-overhead perspective view for as long as user contact is being maintained against that surface location. When the device detects cessation of the user contact with the surface location, the device can responsively resume presenting the stack of segment indicators from the direct overhead view.

Additionally, in some such embodiments, while user contact is being maintained against the original location at (or corresponding to) which the stack of segment indicators is being presented, the device can temporarily move the stack of segment indicators from that original location to another location on the display for as long as user contact is being maintained against the original location. In this manner, the appearance of the stack of segment indicators is less likely to be obscured by the user's finger when the original location of the contact is on a touchscreen display. When the device detects cessation of the user contact with the original location, the device can responsively move the stack of segment indicators back to the original location, or a position that corresponds to the original location.

Figure 12:
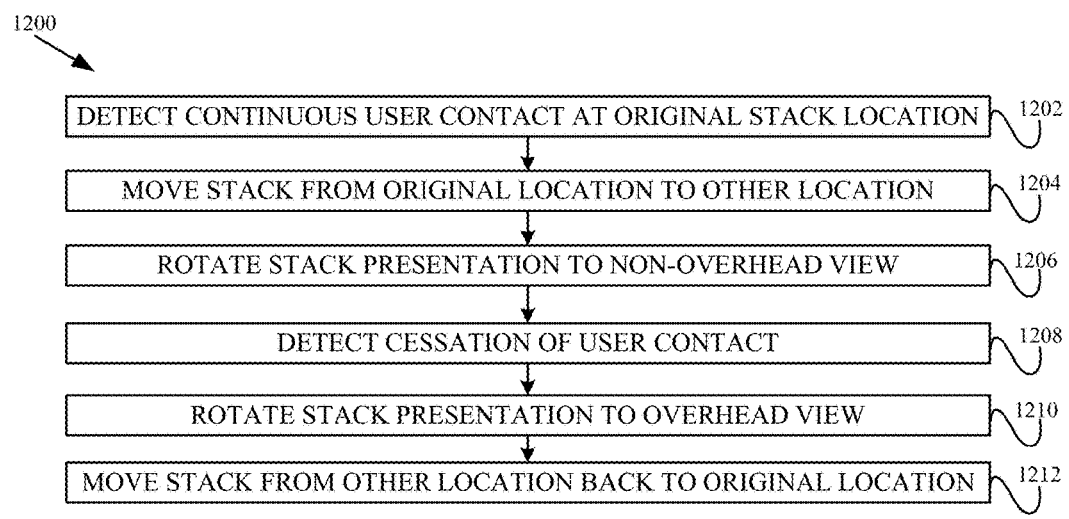
FIG. 12 is a flow diagram that illustrates an example of a technique for temporarily moving a stack of segment indicators and altering an apparent perspective with which the stack is presented for a duration of maintenance of user contact with a touch-sensitive display, according to some embodiments.

FIG. 12 is a flow diagram that illustrates an example 1200 of a technique for temporarily moving a stack of segment indicators and altering an apparent perspective with which the stack is presented for a duration of maintenance of user input (e.g., maintenance of user contact with a touch-sensitive display), according to some embodiments. Although the example technique involves operations being performed in a specific order, variants of the technique according to some embodiments can involve these or different operations being performed in different orders.

In block 1202, a device detects that user input has been continuously maintained, for at least a specified threshold amount of time at a location that corresponds to an original location at which a stack of segment indicators is presented on a display. In block 1204, the device responsively moves the stack of segment indicators from the original location to another location on the display. In this manner, the appearance of the stack of segment indicators is less likely to be obscured by the user's finger when the original location of the contact is on a touchscreen display. In some embodiments, the device animates the movement to show the stack sliding from the original location to the other location. In block 1206, the device rotates the presentation of the stack of segment indicators from a direct overhead view (as illustrated in FIG. 5) to a non-overhead perspective view (as illustrated in FIG. 10).

In block 1208, the device detects a cessation of the user input (e.g., cessation of the user contact against the original location on the touch-sensitive display). In block 1210, the device rotates the presentation of the stack of segment indicators from the non-overhead perspective view (as illustrated in FIG. 10) to the direct overhead view (as illustrated in FIG. 5). In block 1212, the device moves the stack of segment indicators from the other location to the original location on the display. In some embodiments, the device animates the movement to show the stack sliding from the other location back to the original location.

Tabular Interface Segments

As is discussed above, a multi-segment interface can involve an active segment that a device currently displays and one or more inactive segments that the device does not currently display. The phrases "active segment" and "inactive segment" are used herein. An "active segment" is a segment that is currently being displayed in full, without any portion thereof being obscured by other segments. In some embodiments, the device detects and responds to user interactions with interface elements within the active segment. In contrast, an "inactive segment" is a segment that is not currently being displayed in full, although parts of an inactive segment can be shown while other parts are obscured (e.g., by the active segment). In some embodiments, the device does not provide a user with opportunities to interact with interface elements contained in inactive segments while those segments remain inactive, although the device can detect and respond to user interactions that cause the device to make an inactive segment active. Pages and tabs are both types of segments.

Responsive to user input such as swiping gestures, the device can swap the statuses of a pair of these interface segments, causing the active interface segment to become inactive and causing an inactive segment to become active. In examples of embodiments discussed above, the interface segments assumed the form of pages, the active one of which was displayed at any given moment. However, some embodiments can involve interface segments that are not pages, and which might be partially displayed and partially obscured while inactive. For example, as is discussed below, the segments can be partially overlapping tabs within a series of tabs. Parts of inactive tabs can be visible even though those inactive tabs might be partially obscured by other tabs in the series.

Figure 13:
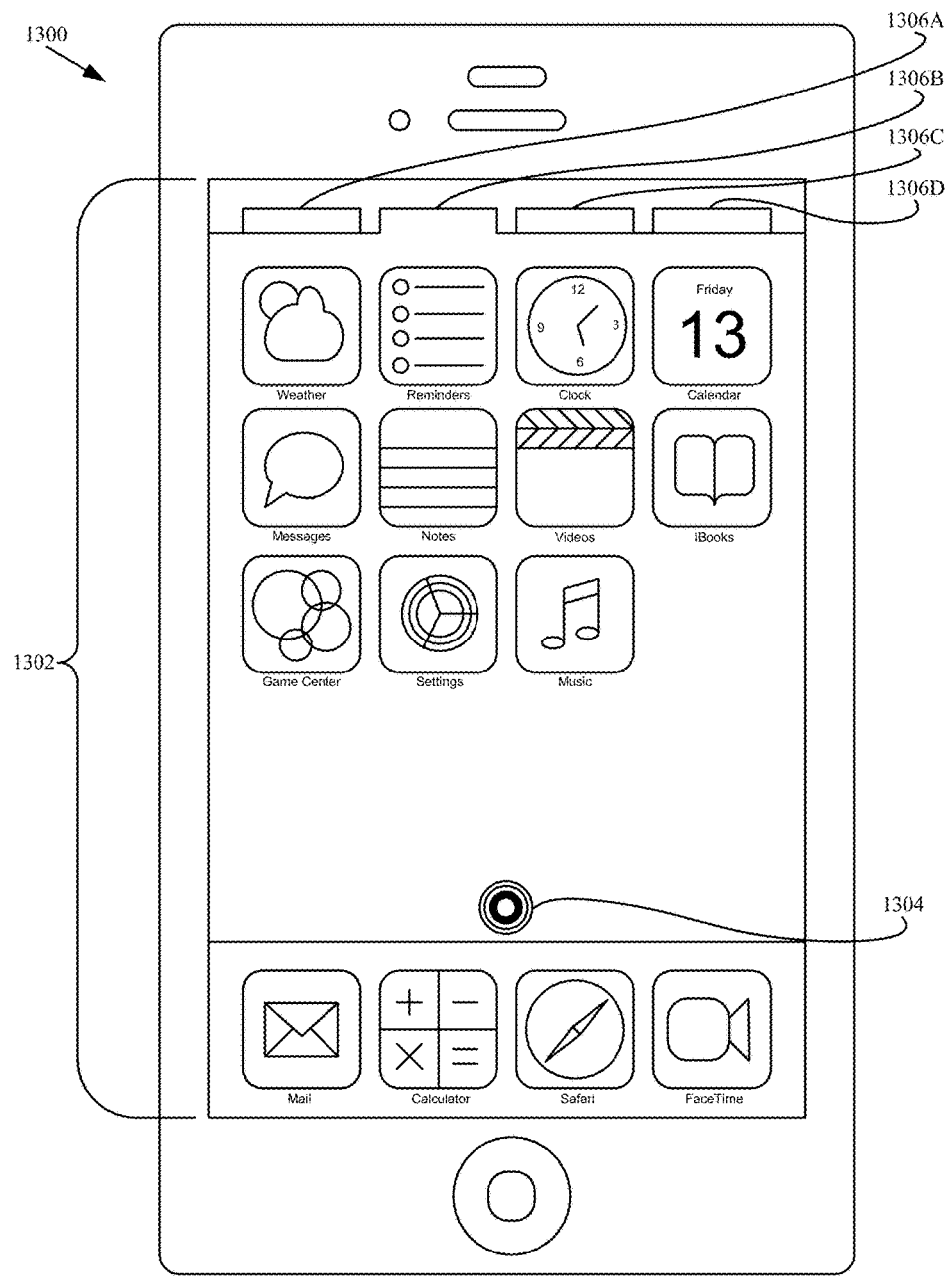
FIG. 13 is a diagram that illustrates an example of a graphical interface in which an active tab in a series of tabs is indicated by a highlighted segment indicator is a stack of segment indicators, according to some embodiments.

FIG. 13 is a diagram that illustrates an example 1300 of a graphical interface 1302 in which an active tab in a series of tabs is indicated by a highlighted segment indicator in a stack of segment indicators, according to some embodiments. As shown, segment indicators 1304 include an indicator that is filled-in or otherwise highlighted, along with other indicators that are not filled-in or otherwise highlighted. Although four concentric segment indicators 1304 are shown in this example, different quantities of indicators can be displayed.

In graphical interface 1302, the interface segments of the multi-segment interface are tabs 1306A-D. Unlike examples in which interface segments are pages, each of tabs 1306A-D can be at least partially displayed in graphical interface 1302 concurrently with each other of tabs 1306A-D. A currently active one of tabs 1306A-D (in the illustrated example, tab 1306B) can at least partially obstruct contents of others of tabs 1306A-D that are not currently active.

Similar to embodiments in which the interface segments are pages, the device's detection of a leftward or rightward swiping gesture can cause the device to make the tab immediately previous to or following the currently active one of tabs 1306A-D in a sequence the new currently active tab. In response to a new one of tabs 1306A-D becoming the currently active tab, the device can fully reveal contents of that tab previously obscured by other tabs. This revelation can simultaneously cause contents of the previously active tab to become at least partially obscured. Additionally, in response to a new one of tabs 1306A-D becoming the currently active tab, the device can modify segment indicators 1304 so that a particular segment indicator corresponding to the new currently active tab becomes highlighted.

Additionally or alternatively, the device's detection of user interaction with an unobscured portion of a currently inactive one of tabs 1306A-D can cause the device to make that current inactive tab the new currently active tab, regardless of the sequential relation between the previous and new currently active tabs. For example, in response to the device detecting user contact against its touch-sensitive surface at a location that corresponds to a display location at which at least a part of tab 1306D is presented, the device can cause tab 1306B to become inactive, and can cause tab 1306D to become the currently active tab. The device can modify segment indicators 1304 by highlighting the particular segment indicator that corresponds to the new currently active tab.

Segment Stack-Triggered Interface Segment Activation

In embodiments discussed above, a device's detection of user interaction with interface segments, such as pages or tabs, can cause the device to change which of the interface segments is the currently active interface segment. In some of these embodiments, the device can respond either to its detection of user interaction with an interface segment or to its changing of the currently active interface segment by updating a stack of segment indicators to reflect (e.g., by highlighting a particular segment indicator in the stack) which of the interface segments has become the newly currently active interface segment. Thus, in some of these embodiments, an activation of a different interface segment can trigger the modification of the segment indicators accordingly.

However, in some embodiments, which can be combined with various embodiments discussed above, user interaction with the stack of segment indicators can instead trigger the activation of a different interface segment (e.g., page, tab, etc.) in a multi-segment interface. For example, in response to detecting a single-tap gesture relative to a location corresponding to a stack of segment indicators shown on its display, a device can cause an inactive interface segment immediately following a currently active interface segment in a sequence to become the new currently active interface segment. For another example, in response to detecting a double-tap gesture relative to a location corresponding to such a stack of segment indicators, the device can cause an inactive interface segment immediately preceding the currently active interface segment in the sequence to become the new currently active interface segment.

For yet another example, in response to detecting a user's maintenance of continuous contact relative to a location corresponding to such a stack of segment indicators for at least a specified threshold amount of time (e.g., 1 second, 2 seconds, etc.), the device can periodically cycle through a sequence of interface segments at a specified speed (e.g., one interface segment per half second). As the device cycles through the sequence of interface segments, the device can cause each interface segment cycled through to become the new currently active interface segment in turn. As each such interface segment becomes the new currently active interface segment, the device can refresh the display of the stack of segment indicators to indicate, using any of the techniques described above, which of the interface segments is the currently active interface segment.

Although specific gestures such as single-tapping, double-tapping, and continuous contact are discussed in the examples above, some embodiments can involve other different gestures that cause the device to perform similar operations. In some embodiments, the device can store a custom user-generated mapping between user-selected gestures and various interface segment activation operations. The device can follow and abide by this custom mapping in response to detecting user gestures against a touch-sensitive surface relative to a location corresponding to the stack of segment indicators.

Figure 14:
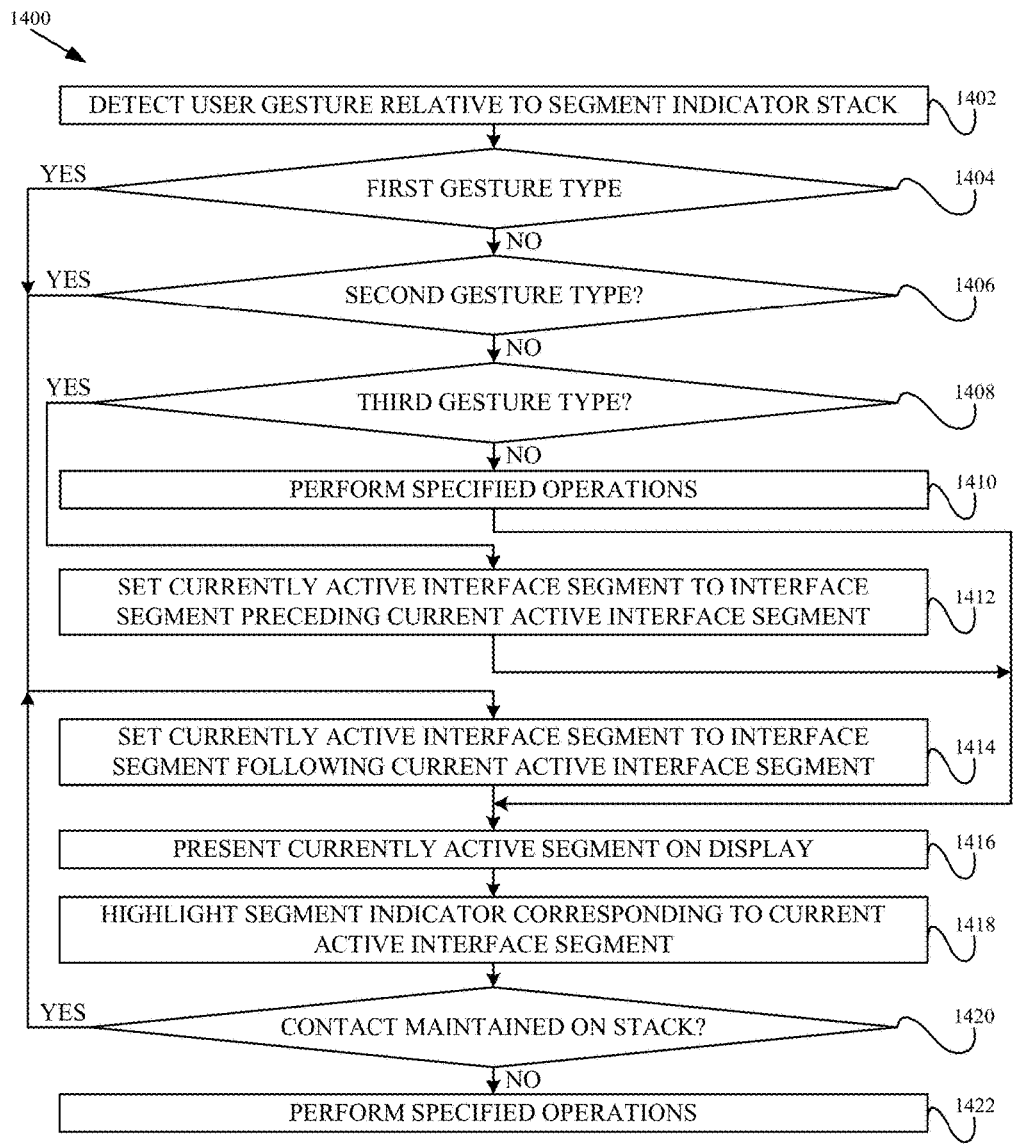
FIG. 14 is a flow diagram that illustrates an example of a technique for activating a different interface segment of a multi-segment interface in response to the detection of user interaction relative to displayed segment indicators, according to some embodiments.

FIG. 14 is a flow diagram that illustrates an example 1400 of a technique for activating a different interface segment of a multi-segment interface in response to the detection of user interaction relative to displayed segment indicators, according to some embodiments. Although the example technique involves operations being performed in a specific order, variants of the technique according to some embodiments can involve these or different operations being performed in different orders.

In block 1402, a device detects a user gesture performed at a location on a touch-sensitive surface corresponding to a position at which a stack of segment indicators is presented.

In block 1404, the device determines whether the user gesture is a first specified type of gesture. For example, the device determines whether the user gesture is a single-tap. If the user gesture is the first specified type of gesture, then the device sets the currently active interface segment in block 1414. Otherwise, the device makes a subsequent determination in block 1406.

In block 1406, in response to determining that the user gesture is not the first specified type of gesture, the device determines whether the user gesture is a second specified type of gesture. For example, the device determines whether the user gesture is continuous contact for at least a specified threshold amount of time (e.g., 1 second, 2 seconds, etc.). If the user gesture is the second specified type of gesture, then the device sets the currently active interface segment in block 1414. Otherwise, the device makes a subsequent determination in block 1408.

In block 1408, in response to determining that the user gesture is not the second specified type of gesture, the device determines whether the user gesture is a third specified type of gesture. For example, the device determines whether the user gesture is a double-tap. If the user gesture is the third specified type of gesture, then the device sets the currently active interface segment in block 1412. Otherwise, the device performs specified operations in block 1410.

In block 1410, in response to determining that the user gesture is not the third specified type of gesture, the device performs some specified operations, potentially different from those described below, relative to the multi-segment user interface. The device then presents the currently active interface segment in block 1416.

Alternatively, in block 1412, in response to determining that the user gesture is the third specified type of gesture, the device sets the currently active interface segment to be the interface segment that immediately precedes the currently active interface segment in a sequence of interface segments. Alternatively, if no interface segment immediately precedes the currently active interface segment in the sequence, then the device sets the currently active interface segment to be the last interface segment in the sequence, thereby "looping around." The device then presents the currently active interface segment in block 1416.

Alternatively, in block 1414, in response to determining that the user gesture is the first or second types of gesture, the device sets the currently active interface segment to be the interface segment that immediately follows the currently active interface segment in a sequence of interface segments. Alternatively, if no interface segment immediately follows the currently active interface segment in the sequence, then the device sets the currently active interface segment to be the first interface segment in the sequence, thereby "looping around." The device then presents the currently active interface segment in block 1416.

In block 1416, the device presents the currently active interface segment (e.g., page, tab, etc.) on its display. In block 1418, the device highlights a particular segment indicator that corresponds to the currently active interface segment. In some embodiments, the device un-highlights others of the segment indicators.

In block 1420, the device determines whether user contact continues to be maintained relative to the location on the touch-sensitive surface corresponding to a position at which the stack of segment indicators is presented. If such user contact continues to be maintained, then (optionally after the passage of a specified amount of time) the device again sets the currently active interface segment in block 1414. Otherwise, the device performs specified operations in block 1422.

In block 1422, the device performs some specified operations, potentially different from those described above. The device optionally can repeat the technique described above in connection with FIG. 14 in response to detecting another user gesture relative to a touch-sensitive surface position corresponding to the displayed location of the segment indicators.

Beneficially, embodiments that cause a device to activate, cyclically and periodically, different interface segments while the device continues to detect user contact relative to the displayed segment indicators enable a user to navigate through such interface segments without requiring repetitive motions, such as repeated swiping gestures, on the user's part.

Expandable and Collapsible Segment Indicator Stack

In some embodiments discussed above, segment indicators in a stack remain positioned on top of each other, or inside of each other when rendered consistent with an overhead view. The stacked segment indicators therefore at least partially overlap. In some embodiments described below, responsive to specific user gestures, a device can expand the segment indicators outward, some specified distance away from their original positions, to positions surrounding those original positions.

While in this expanded configuration, the segment indicators optionally cease to overlap each other even partially. While in this expanded configuration, in some embodiments, the segment indicators can occupy positions along a perimeter of an invisible circle centered at the indicator's original positions and having the specified distance as its radius. The segment indicators are, optionally, spaced equidistantly from each other. Other arrangements of the segment indicators in the expanded configuration are also possible. In some embodiment, these arrangements may be determined based upon the position of the segment indicators in the non-expanded configuration.

In some embodiments, a device can detect a specified user gesture relative to a position corresponding to a location of the stacked segment indicators, and can expand the segment indicators outward as described above in response. For example, the device can expand the segment indicators in response to detecting that user contact has been continuously maintained against its touch-sensitive surface at a position corresponding to the display location of the segment indicator stack. In some embodiments, the device can maintain the segment indicators in the expanded configuration until the device detects a cessation of continuous user contact relative to the touch-sensitive surface. In response to detecting that continuous user contact relative to the touch-sensitive surface has ceased, the device can collapse the segment indicators back into their original configuration, in which they at least partially overlap.

According to some embodiments, while the segment indicators are being presented in the expanded configuration described above, and while the device detects maintenance of continuous user contact on the touch-sensitive surface, the device can detect selection of one of the segment indicators in the expanded configuration (e.g., dragging gestures detected on the surface starting at a location corresponding to the original stack position and ending at any of the positions corresponding to display locations that the segment indicators occupy in the expanded configuration). Additionally or alternatively, while the segment indicators are being presented in the expanded configuration described above, and while the device detects maintenance of continuous user contact on the touch-sensitive surface, the device can detect dragging gestures made against the surface starting from any of the positions that correspond to display locations that the segment indicators occupy in the expanded configuration and ending at any other of the locations that correspond to positions that the segment indicators occupy in the expanded configuration.

In some such embodiments, in response to detecting such a dragging gesture, the device can activate an interface segment (e.g., page, tab, etc.) corresponding to the segment indicator that is the target or destination of the dragging gesture detected. Using this technique, the device can enable a user to navigate to a particular interface segment more quickly and more directly than otherwise might be possible.

Figure 15:
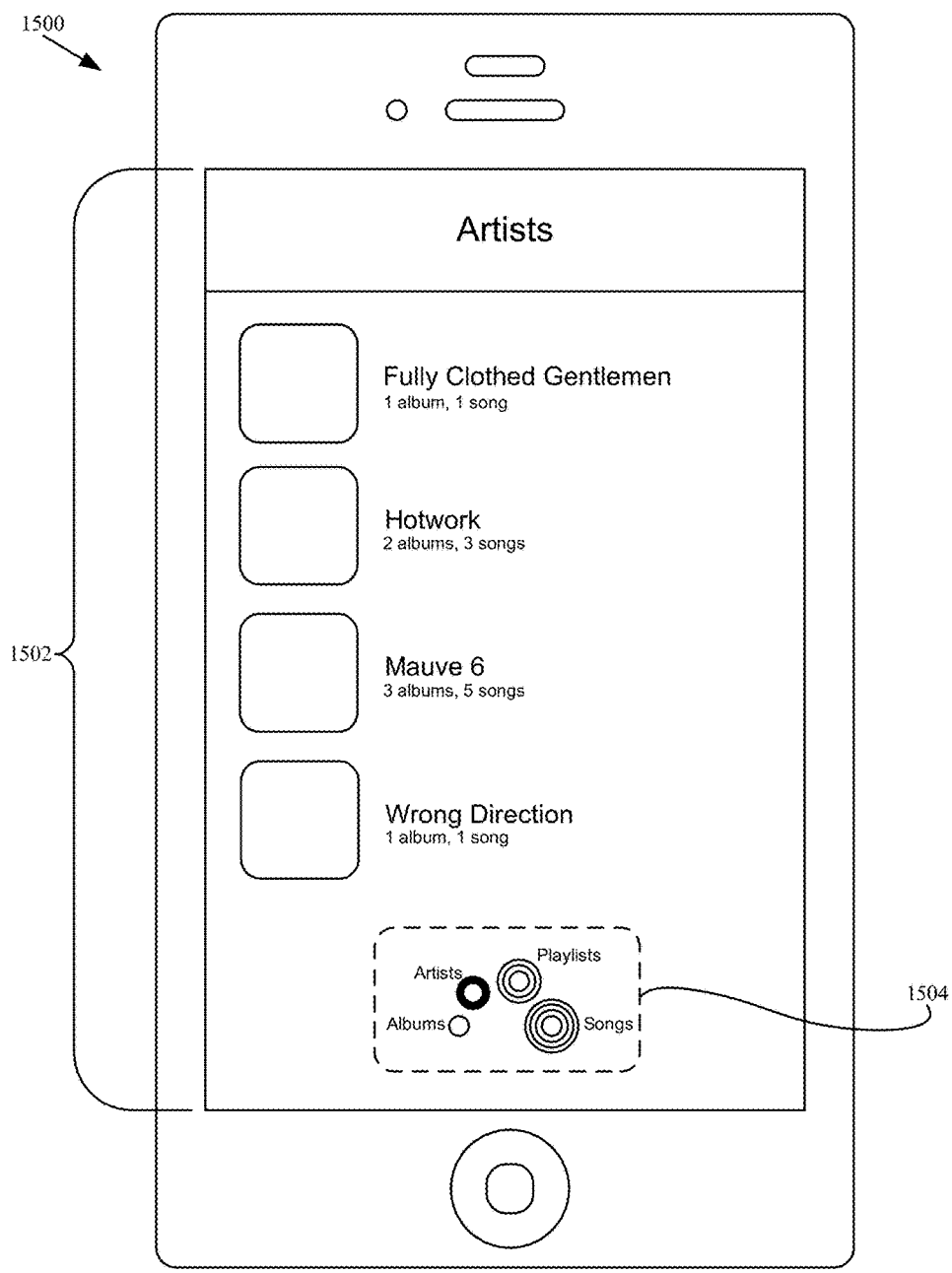
FIG. 15 is a diagram that illustrates an example of a graphical interface in which multiple formerly stacked segment indicators have been expanded outward from their original configuration, according to some embodiments.

FIG. 15 is a diagram that illustrates an example 1500 of a graphical interface 1502 in which multiple formerly stacked segment indicators have been expanded outward from their original configuration, according to some embodiments. Segment indicators 1504 are shown in the expanded configuration described above. In the embodiment depicted in FIG. 15, each of segment indicators 1504 is accompanied by a textual description or label associated with the interface segment to which that segment indicator corresponds. As shown in FIG. 15, these labels include "Albums," "Artists," "Playlists," and "Songs."

Each of segment indicators 1504 can be represented as a dot encompassed by zero or more concentric rings. In some embodiments, the quantity of rings surrounding the central dot in a particular segment indicator indicates the order of its corresponding interface segment in a sequence of interface segments. If the outermost ring (or dot, if there are no rings encompassing the dot) of a particular segment indicator is currently highlighted, then this indicates that the interface segment corresponding to that particular segment indicator is the currently active interface segment (e.g., displayed page, unobscured tab, etc.). In example 1500, the segment indicator corresponding to the second interface segment, labeled "Artists," is the currently active interface segment.

According to some embodiments, even while segment indicators 1504 are in their original collapsed configuration, each segment indicator's association with a particular interface segment can be visibly apparent from its size and orientation relative to the others of segment indicators 1504; larger segment indicators having perimeters lying farther from the stack's center are associated with interface segments occurring later in a sequence of interface segments, while smaller segment indicators having perimeters lying closer to the stack's center are associated with interface segments occurring earlier in that sequence of interface segments. Even while segment indicators 1504 are in their original collapsed configuration, each segment indicator in the stack can remain at least partially visible.

The differing sizes and encompassing natures of the stacked segment indicators can make the techniques described herein especially scalable; when an additional interface segment is to be added to the multi-segment interface, the segment indicator stack can accommodate the addition by encompassing the existing segment indicators with an incrementally larger segment indicator. Viewed from another perspective, another segment indicator can be added to the bottom of the stack. In some embodiments, the device can size a newly added segment indicator incrementally larger than the currently largest segment indicator in the stack. In some embodiments, the device can incrementally shrink each of the existing segment indicators in the stack when the device adds a new segment indicator to the stack. In some embodiments, the segments indicators are the same size.

Figure 16:
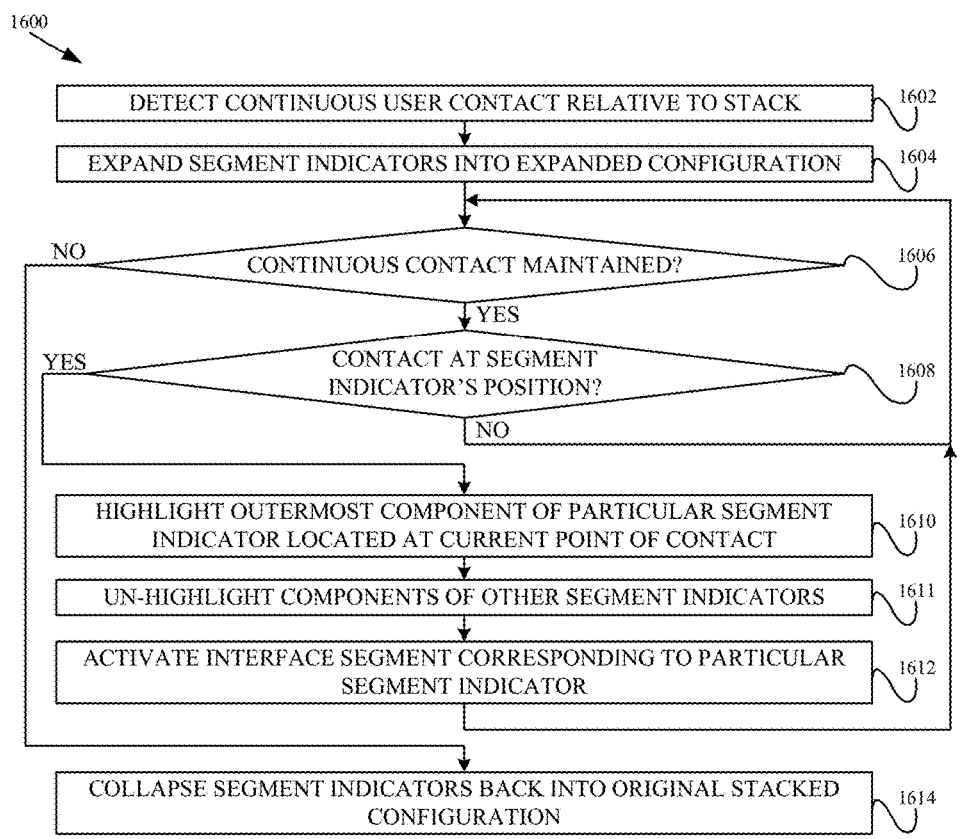
FIG. 16 is a flow diagram that illustrates an example of a technique for expanding and collapsing a segment indicator stack, and for activating different interface segments responsive to user gestures conducted relative to segment indicators in an expanded configuration, according to some embodiments.

FIG. 16 is a flow diagram that illustrates an example 1600 of a technique for expanding and collapsing a segment indicator stack, and for activating different interface segments responsive to user gestures conducted relative to segment indicators in an expanded configuration, according to some embodiments. Although the example technique involves operations being performed in a specific order, variants of the technique according to some embodiments can involve these or different operations being performed in different orders.

In block 1602, a device detects that user contact has been maintained against its touch-sensitive surface at a location corresponding to a displayed position of a segment indicator stack in an original collapsed configuration for at least a specified amount of time (e.g., 1 second, 2 seconds, etc.).

In block 1604, the device responsively expands the segment indicators within the stack into an expanded configuration. In so doing, in some embodiments, the device animates the expansion by gradually moving each segment indicator outward from the center of the segment indicator stack's original position. Additionally, in some embodiments, the device adds textual descriptions or labels to each segment indicator as a part of the expansion process. For example, as shown in FIG. 15, the device adds, to various segment indicators, labels such as "albums," "artists," "playlists," and "songs."

Referring again to FIG. 16, in block 1606, the device can determine whether user contact continues to be maintained against the touch-sensitive surface. If so, then the device makes a subsequent determination in block 1608. Otherwise, the device collapses the segment indicators in block 1614.

In block 1608, in response to determining that user contact continues to be maintained against the touch-sensitive surface, the device determines whether the point of user contact is currently at a position corresponding to a displayed location of a segment indicator in the expanded configuration. Immediately after expansion of block 1604, the point of user contact might no longer be at a position corresponding to a displayed location of a segment indicator. If the points of user contact is currently at a position corresponding to a displayed location of a segment indicator in the expanded configuration, then the device highlights an outermost component of a particular segment indicator in block 1610. Otherwise, the device continues to determine whether user contact continues to be maintained against the touch-sensitive surface in block 1606.

In block 1610, in response to determining that the point of user contact is currently at a position corresponding to a displayed location of a segment indicator in the expanded configuration, the device highlights an outermost component (e.g., ring or dot) of a particular segment indicator located at a display position corresponding to the current point of user contact. In some embodiments, the device highlights all of the components of the particular segment indicator instead. In block 1611, the device un-highlights components of other segment indicators not located at display positions corresponding to the current point of user contact.

In block 1612, the device activates an interface segment (e.g., page, tab, etc.) corresponding to the particular segment indicator. In some embodiments, as a part of activating the interface segment, the device presents contents of the interface segment in a manner that makes those contents unobscured. The device then continues to determine whether user contact continues to be maintained against the touch-sensitive surface in block 1606. In some embodiments, the device detects whether the interface segment corresponding to the particular segment indicator is already the currently active interface segment. If so, then the device omits the performance of the operations of blocks 1610-1612.

Alternatively, in block 1614, in response to determining that user contact no longer continues to be maintained against the touch-sensitive surface, the device responsively collapses the segment indicators back into their original stacked configuration. In so doing, in some embodiments, the device animates the collapse by gradually moving each segment indicator inward toward the center of the segment indicator stack's original position. Additionally, in some embodiments, the device removes textual descriptions or labels from each segment indicator as a part of the collapsing process. In some embodiments, following the collapse of the segment indicators in the manner described above, the device maintains the currently active interface segment and the highlighting of the corresponding segment indicator.

The device optionally can repeat the technique described above in connection with FIG. 16 in response to detecting re-applied continuous user contact relative to a location corresponding to a displayed position of the collapsed segment indicator stack. Some embodiments described herein refer to the use of a segment indicator stack in the context of an operating system. Some embodiments can be similarly applicable to a variety of kinds of applications that can be executed on a device. For example, a music-playing application can incorporate the expandable and collapsible segment indicator stack described above.

Pie-Sliced Segment Indicators

In some embodiments discussed above, segment indicators can be presented in a stacked configuration, in which at least some of the segment indicators can at least partially overlap at least some others of the segment indicators. In some embodiments, segment indicators can be presented in a configuration that resembles a sliced pie, with each segment indicator assuming the form of a wedge having a point that meets the points of the other segment indicators at the "pie's" center.

Figure 17:
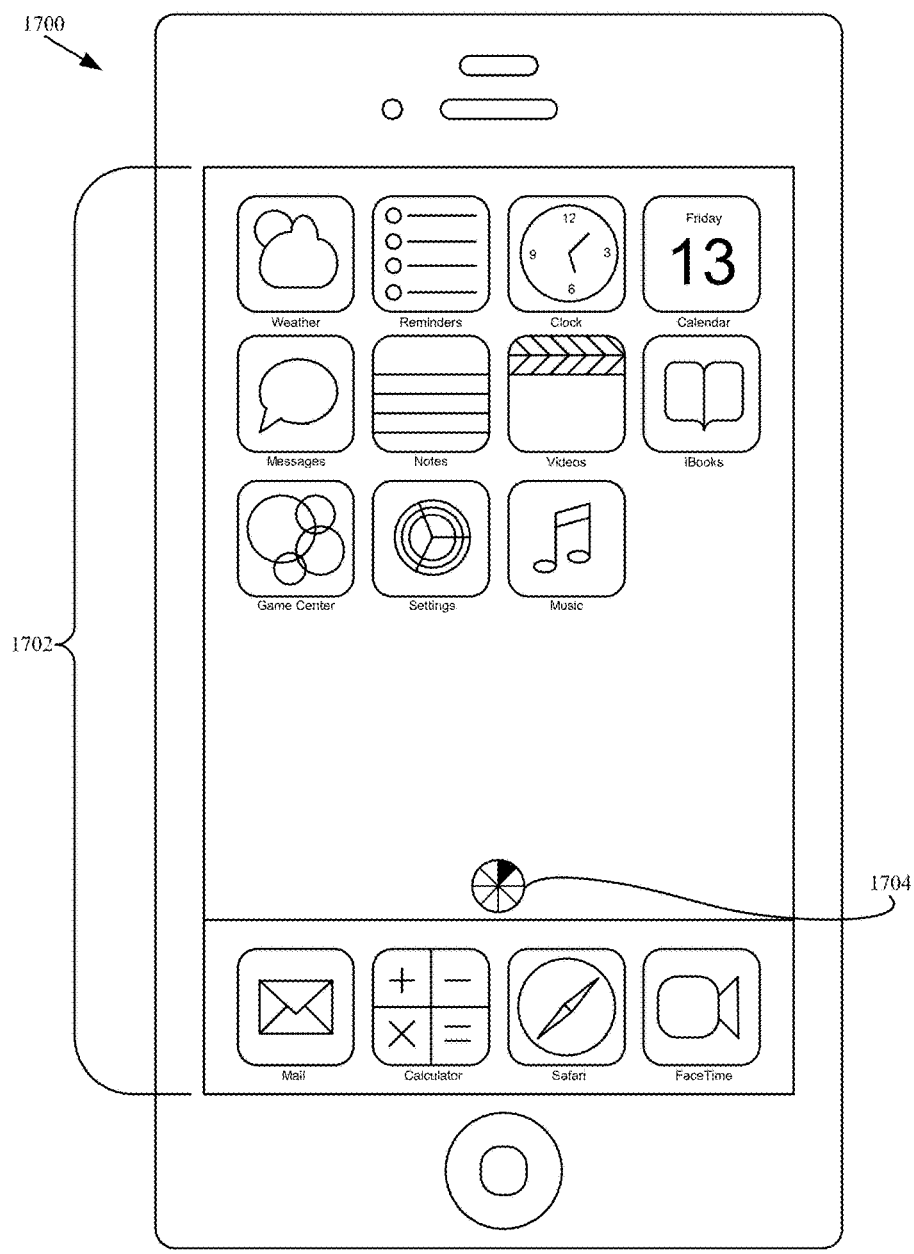
FIG. 17 is a diagram that illustrates an example of a graphical interface in which a position of a currently active interface segment within a sequence of interface segments can be indicated through the use of segment slices, according to some embodiments.

FIG. 17 is a diagram that illustrates an example 1700 of a graphical interface 1702 in which a position of a currently active interface segment within a sequence of interface segments can be indicated through the use of segment slices. As shown, segment slices 1704 include one slice that is filled-in or otherwise highlighted, along with other slices that are not filled-in or otherwise highlighted. Although eight segment slices 1704 are shown in this example, different quantities of slices can be displayed. Although visible demarcations between segment slices 1704 are shown in example 1700, segment slice 1704 can be presented without any distinguishing demarcations.

The quantity of slices is representative of the quantity of pages that are contained within the multi-segmented interface. Each of segment slices 1704 is representative of a different page. Each page can include multiple application icons or other content. The currently highlighted slice indicates, at the bottom of interface 1702, which of the several pages of application icons or other content is currently being presented.

Addition of a new application icon to the multi-segmented interface can cause a new page to be created in the multi-segmented interface, and for the new application icon to be added to the newly created page. The creation of a new page also can cause a new segment slice to be added to segment slices 1704. Conversely, the removal of the last application icon from a particular page of the multi-segmented interface can cause that particular page to be deleted, along with its representative one of segment slices 1704. In some embodiments, when a new segment slice is added to segment slices 1704, or when a segment slice is removed from segment slices 1704, the device can re-size the segment slices such that all of the slices have the same area following the addition or removal.

While the device is presenting a currently active page, the device can detect a leftward or rightward swiping gesture made by a user in the vicinity of the application icons or other content. The detection of this swiping gesture can cause the device to change which page of application icons or other content is currently being presented in interface 1702. The device's presentation of a different page of application icons or other content in this manner also can cause the device to highlight a different one of segment slices 1704 in order to signify which of the pages is currently being presented.

For example, if the device is currently presenting the second of eight pages in interface 1702, then the device's detection of a rightward swiping gesture can cause the device (a) to move the second of the eight pages rightward out of bounds of the display and (b) to move the first of the eight pages rightward virtually from beyond the display into the bounds of the display. This gesture can also cause the device to remove the highlighting from a particular one of segment slices 1704 and to add highlighting to a slice immediately counter-clockwise of that particular segment slice, signifying that the first of the eight pages of application icons is now the currently active page.

For another example, if the device is currently presenting the first of eight pages in interface 1702, then the device's detection of a leftward swiping gesture can cause the device (a) to move the first of the eight pages leftward out of bounds of the display and (b) to move the second of the eight pages leftward virtually from beyond the display into the bounds of the display. This gesture can also cause the device to remove the highlighting from a particular one of segment slices 1704 and to add highlighting to a slice immediately clockwise of that particular segment slice, signifying that the second of the eight pages of application icons is now the currently active page.

In some embodiments, the device might not reveal segment slices 1704 until there is more than one page of application icons in the multi-segmented interface. According to one technique, the device might reveal segment slices 1704 in response to prospective creation of the second page through the addition of a new application icon to the multi-segmented interface.

In some embodiments, the device can activate an interface segment corresponding to a particular one of segment slices 1704 in response to detecting user contact against the touch-sensitive display relative to that particular segment slice. In such a scenario, the device also can responsively highlight the particular segment slice and un-highlight other segment slices.

Vertical Bar Segment Indicators

In some embodiments, segment indicators can be presented in a configuration that resembles a vertical bar, similar to a slider control lacking a thumb, with each segment indicator occupying equally long segments of the vertical bar. Although examples discussed below refer to a vertical bar, other examples could involve a horizontal bar or a bar existing at any angle.

Figure 18:
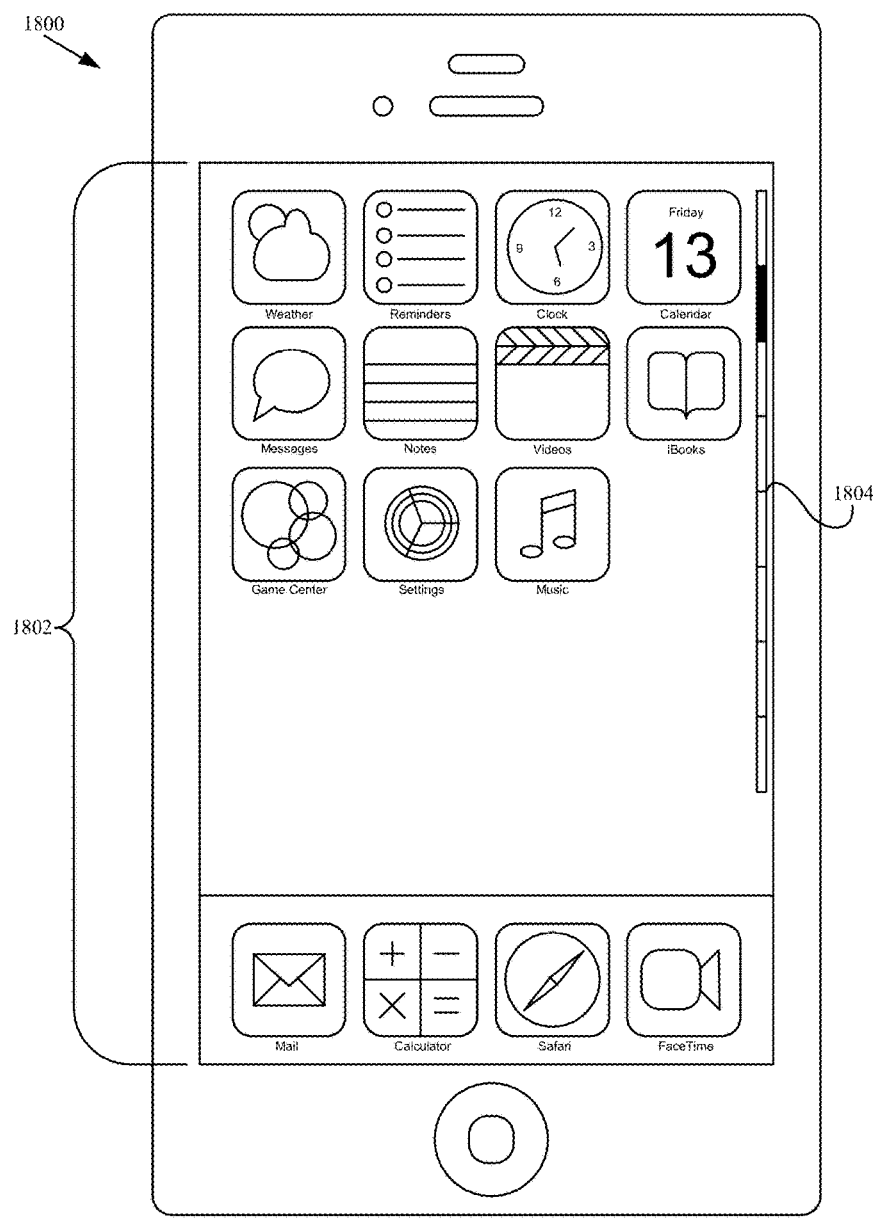
FIG. 18 is a diagram that illustrates an example of a graphical interface in which a position of a currently active interface segment within a sequence of interface segments can be indicated through the use of segment bar segments, according to some embodiments.

FIG. 18 is a diagram that illustrates an example 1800 of a graphical interface 1802 in which a position of a currently active interface segment within a sequence of interface segments can be indicated through the use of segment bar segments. As shown, segment bar segments 1804 include one bar segment that is filled-in or otherwise highlighted, along with other bar segments that are not filled-in or otherwise highlighted. Although eight segment bar segments 1804 are shown in this example, different quantities of bar segments can be displayed. Although visible demarcations between segment bar segments 1804 are shown in example 1800, segment bar segments 1804 can be presented without any distinguishing demarcations.

The quantity of bar segments is representative of the quantity of pages that are contained within the multi-segmented interface. Each of segment bar segments 1804 is representative of a different page. Each page can include multiple application icons or other content. The currently highlighted bar segment indicates, at a side of interface 1802, which of the several pages of application icons or other content is currently being presented.

Addition of a new application icon to the multi-segmented interface can cause a new page to be created in the multi-segmented interface, and for the new application icon to be added to the newly created page. The creation of a new page also can cause a new segment bar segment to be added to segment bar segments 1804. Conversely, the removal of the last application icon from a particular page of the multi-segmented interface can cause that particular page to be deleted, along with its representative one of segment bar segments 1804. In some embodiments, when a new segment bar segment is added to segment bar segments 1804, or when a segment bar segment is removed from segment bar segments 1804, the device can re-size the segment bar segments such that all of the bar segments have the same length following the addition or removal.

While the device is presenting a currently active page, the device can detect an upward or downward swiping gesture made by a user in the vicinity of the application icons or other content. The detection of this swiping gesture can cause the device to change which page of application icons or other content is currently being presented in interface 1802. The device's presentation of a different page of application icons or other content in this manner also can cause the device to highlight a different one of segment bar segments 1804 in order to signify which of the pages is currently being presented.

For example, if the device is currently presenting the second of eight pages in interface 1802, then the device's detection of a downward swiping gesture can cause the device (a) to move the second of the eight pages downward out of bounds of the display and (b) to move the first of the eight pages downward virtually from beyond the display into the bounds of the display. This gesture can also cause the device to remove the highlighting from a second of segment bar segments 1804 and to add highlighting to a first of segment bar segments 1804, signifying that the first of the eight pages of application icons is now the currently active page.

For another example, if the device is currently presenting the first of eight pages in interface 1802, then the device's detection of an upward swiping gesture can cause the device (a) to move the first of the eight pages upward out of bounds of the display and (b) to move the second of the eight pages upward virtually from beyond the display into the bounds of the display. This gesture can also cause the device to remove the highlighting from a first of segment bar segments 1804 and to add highlighting to a second of segment bar segments 1804, signifying that the second of the eight pages of application icons is now the currently active page.

In some embodiments, the device might not reveal segment bar segments 1804 until there is more than one page of application icons in the multi-segmented interface. According to one technique, the device might reveal segment bar segments 1804 in response to prospective creation of the second page through the addition of a new application icon to the multi-segmented interface.

In some embodiments, the device can instantly activate an interface segment corresponding to a particular one of segment bar segments 1804 in response to detecting user contact against the touch-sensitive display relative to that particular segment bar segment. In such a scenario, the device also can responsively highlight the particular segment bar segment and un-highlight other segment bar segments.

Hardware Overview

Figure 19:
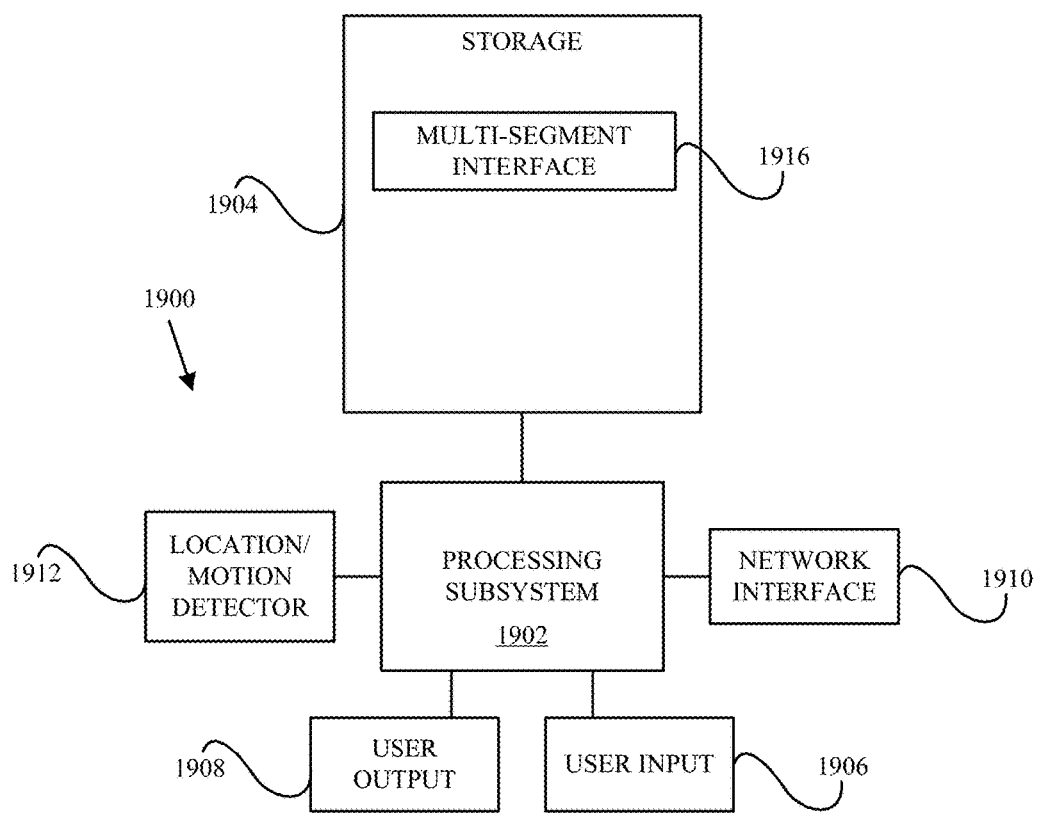
FIG. 19 is a simplified block diagram of a device according to some embodiments.

FIG. 19 is a simplified block diagram of a device 1900 according to some embodiments. Device 1900 can be a mobile device, a handheld device, a notebook computer, a desktop computer, or any suitable electronic device with a screen for displaying images. Examples of device 1900 include without restriction an Apple iPhone®, an Apple iPad®, etc. Device 1900 includes a processing subsystem 1902, a storage subsystem 1904, a user input device 1906, a user output device 1908, a network interface 1910, and a location/motion detector 1912.

Processing subsystem 1902, which can be implemented as one or more integrated circuits (e.g., e.g., one or more single-core or multi-core microprocessors or microcontrollers), can control the operation of device 1900. In various embodiments, processing subsystem 1902 can execute a variety of programs in response to program code and can maintain multiple concurrently executing programs or processes. At any given time, some or all of the program code to be executed can be resident in processing subsystem 1902 and/or in storage subsystem 1904.

Through suitable programming, processing subsystem 1902 can provide various functionality for device 1900. For example, processing subsystem 1902 can execute a multi-segment interface program 1916. Multi-segment user interface program 1916 can present user interface controls for varying the values of parameters of different applications that are also stored in storage subsystem 1904. Multi-segment user interface program 1916 can perform various embodiments described herein.

Storage subsystem 1904 can be implemented, e.g., using disk, flash memory, or any other storage media in any combination, and can include volatile and/or non-volatile storage as desired. In some embodiments, storage subsystem 1904 can store one or more application programs to be executed by processing subsystem 1902 (e.g., multi-segment user interface program 1916). In some embodiments, storage subsystem 1904 can store other data (e.g., used by and/or defined by multi-segment user interface program 1916). Programs and/or data can be stored in non-volatile storage and copied in whole or in part to volatile working memory during program execution.

A user interface can be provided by one or more user input devices 1906 and one or more user output devices 1908. User input devices 1906 can include a touch pad, touch screen, scroll wheel, click wheel, dial, eye tracking camera, button, switch, keypad, microphone, or the like. User output devices 1908 can include a video screen, haptic output generator, indicator lights, speakers, headphone jacks, or the like, together with supporting electronics (e.g., digital-to-analog or analog-to-digital converters, signal processors, or the like). A customer can operate input devices 1906 to invoke the functionality of device 1900 and can view and/or hear output from device 1900 via output devices 1908.

Network interface 1910 can provide voice and/or data communication capability for device 1900. For example, network interface 1910 can provide device 1900 with the capability of communicating with an external server. In some embodiments, network interface 1910 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments, network interface 1910 can provide wired network connectivity (e.g., Ethernet) in addition to or instead of a wireless interface. Network interface 1910 can be implemented using a combination of hardware (e.g., antennas, modulators/demodulators, encoders/decoders, and other analog and/or digital signal processing circuits) and software components.

Location/motion detector 1912 can detect a past, current or future location of device 1900 and/or a past, current or future motion of device 1900. For example, location/motion detector 1912 can detect a velocity or acceleration of mobile electronic device 1900. Location/motion detector 1912 can comprise a Global Positioning Satellite (GPS) receiver and/or an accelerometer. In some instances, processing subsystem 1902 determines a motion characteristic of device 1900 (e.g., velocity) based on data collected by location/motion detector 1912. For example, a velocity can be estimated by determining a distance between two detected locations and dividing the distance by a time difference between the detections.

It will be appreciated that device 1900 described herein is illustrative and that variations and modifications are possible. A device can be implemented as a mobile electronic device and can have other capabilities not specifically described herein (e.g., telephonic capabilities, power management, accessory connectivity, etc.). In a system with multiple devices 1900, different devices 1900 can have different sets of capabilities; the various devices 1900 can be but do not need to be similar or identical to each other.

Further, while device 1900 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 1900 is described as a singular entity, it is to be understood that it can include multiple coupled entities. For example, device 1900 can include a server, a set of coupled servers, a computer and/or a set of coupled computers.

Any of the computer systems mentioned herein optionally utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

The subsystems can be interconnected via a system bus. Additional subsystems can be a printer, keyboard, fixed disk, monitor, which can be coupled to display adapter. Peripherals and input/output (I/O) devices, which couple to an I/O controller, can be connected to the computer system by any number of means known in the art, such as serial port. For example, serial port or external interface (e.g. Ethernet, Wi-Fi, etc.) can be used to connect computer system to a wide area network such as the Internet, a mouse input device, or a scanner. The interconnection via the system bus can allow the central processor to communicate with each subsystem and to control the execution of instructions from system memory or the fixed disk, as well as the exchange of information between subsystems. The system memory and/or the fixed disk optionally embody a computer readable medium. Any of the values mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any embodiments discussed herein can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments described herein using hardware and a combination of hardware and software.

Any of the software components or functions described in this application optionally are implemented as software code to be executed by a processor using any suitable computer language such as, for example, Java, C++ or Perl using, for example, conventional or object-oriented techniques. The software code optionally is stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium optionally is any combination of such storage or transmission devices.

Such programs also optionally are encoded and transmitted using carrier signals adapted for transmission via wired, optical, and/or wireless networks conforming to a variety of protocols, including the Internet. As such, a computer readable medium according to some embodiments optionally are created using a data signal encoded with such programs. Computer readable media encoded with the program code optionally are packaged with a compatible device or provided separately from other devices (e.g., via Internet download). Any such computer readable medium optionally resides on or within a single computer program product (e.g. a hard drive, a CD, or an entire computer system), and optionally is present on or within different computer program products within a system or network. A computer system optionally includes a monitor, printer, or other suitable display for providing any of the results mentioned herein to a user.

Any of the methods described herein optionally are totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps optionally are used with portions of other steps from other methods. Additionally, any of the steps of any of the methods can be performed with modules, circuits, or other means for performing these steps.

The specific details of particular embodiments optionally are combined in any suitable manner without departing from the spirit and scope of embodiments discussed herein. However, other embodiments optionally are directed to specific embodiments relating to each individual aspect, or specific combinations of these individual aspects.

Figure 21:
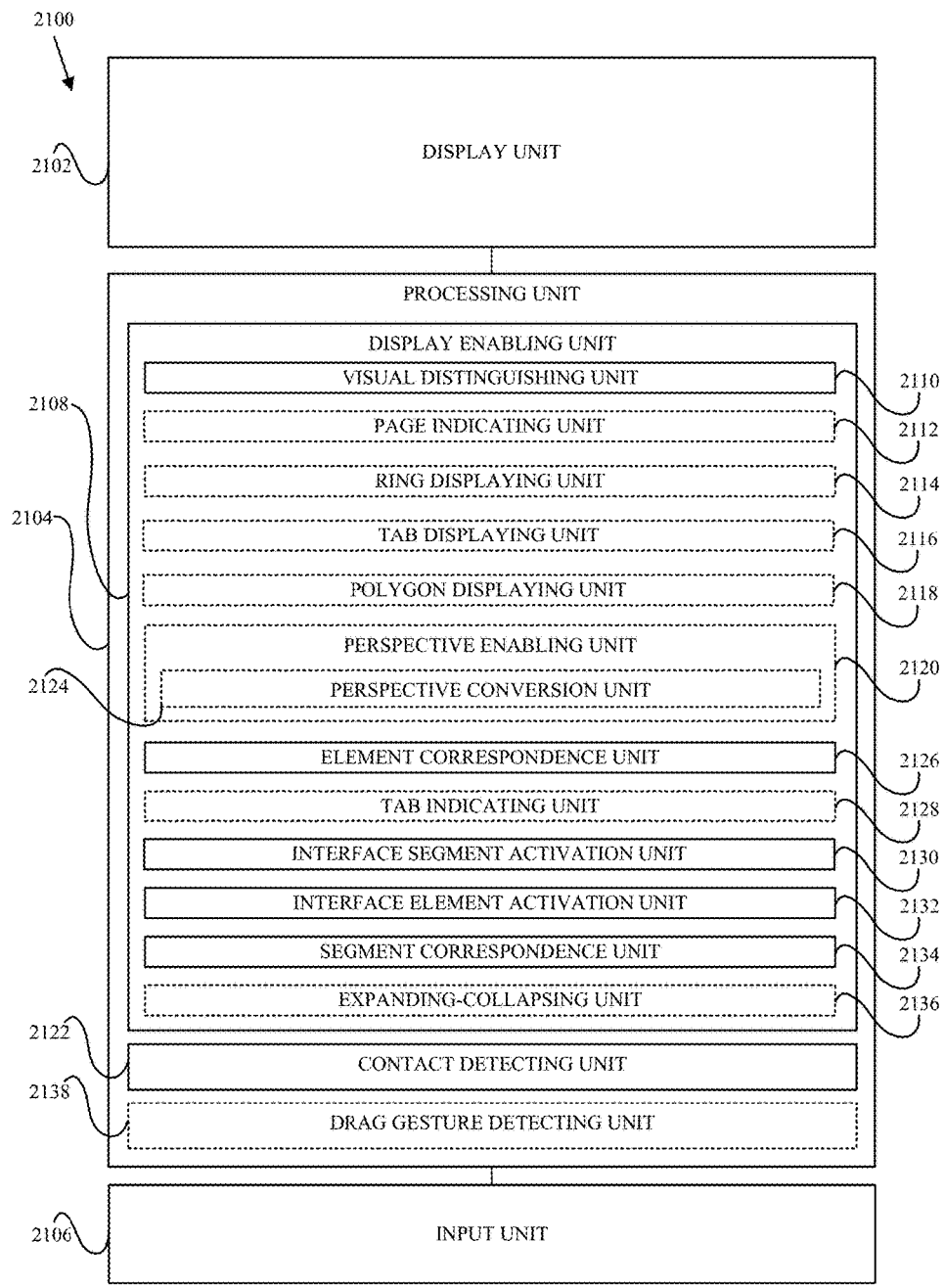
FIG. 21 is a block diagram of a device according to some embodiments.

FIG. 21 is a block diagram of a device 2100 according to some embodiments. Device 2100 includes a display unit 2102 and an input unit 2104 that are coupled to a processing unit 2106. Processing unit 2106 includes a display enabling unit 2108 that displays a set of interface elements that at least partially overlap each other. The set includes a particular interface element that indicates which particular interface segment, of a plurality of interface segments, is currently active. Display enabling unit 2108 optionally includes a visual distinguishing unit 2110 that visually distinguishes the particular interface element from a remainder of the interface elements in the set. The interface segments other than the particular interface segment are currently inactive.

Display enabling unit 2108 optionally includes a page indicating unit 2112. A first interface element of the interface elements contains a second interface element of the interface elements. Page indicating unit 2112 causes the particular interface element to indicate which particular page, of a plurality of pages, is being displayed. Page indicating unit 2112 does not display pages other than the particular page while the particular page is being displayed.

Display enabling unit 2108 optionally includes a ring displaying unit 2114. Ring displaying unit 2114 displays the set of interface elements as a set of concentric rings. Ring displaying unit 2114 includes, in the set of concentric rings, a particular ring that indicates which particular interface segment, of the plurality of interface segments, is currently unobstructed by any of the other interface segments in the plurality of interface segments. Ring displaying unit 2114 causes the interface segments other than the particular interface segment to be at least partially obstructed. Display enabling unit includes a tab displaying unit 2116 that displays the plurality of interface segments as a plurality of tabs.

Display enabling unit 2108 optionally includes a polygon displaying unit 2118. Polygon displaying unit 2118 causes the set of interface elements to be displayed as a set of polygons in which a first polygon is displayed within a second polygon, and in which the second polygon is displayed within a third polygon.

Display enabling unit 2108 optionally includes a perspective enabling unit 2120. Perspective enabling unit 2120 causes the set of interface elements to be displayed as a non-overhead perspective view of the interface elements in which at a first interface element in the set has an appearance of being stacked on top of a second interface element in the set. Processing unit 2106 includes a contact detecting unit 2122 that detects user contact with input unit 2104 at a location corresponding to a position at which the perspective view of the interface elements is presented on display unit 2102. Perspective enabling unit 2120 includes a perspective conversion unit 2124 that converting the perspective view into an overhead view in which the first interface element has an appearance of being contained within the second interface element. Contact detecting unit 2122 detects a cessation of user contact with display at the location. In response to contact detecting unit 2122 detecting the cessation, perspective conversion unit 2124 converts the overhead view back into the non-overhead perspective view.

Display enabling unit 2108 optionally includes an element correspondence unit 2126 that makes different interface elements of the plurality of interface elements correspond to different interface segments of the plurality of interface segments. Element correspondence unit 2126 makes two or more interface elements of the plurality of interface elements to be separate rings within concentric rings. Element correspondence unit 2126 makes the particular interface element a particular ring within the concentric rings. Visual distinguishing unit 2110 visually distinguishes the particular interface element by highlighting the particular ring, highlighting one or more rings of the concentric rings within the particular ring, and presenting, without highlighting, one or more rings of the concentric rings outside of the particular ring.

Element correspondence unit 2126 makes different interface elements of the plurality of interface elements correspond to different interface segments of the plurality of interface segments. Element correspondence unit 2126 makes two or more interface elements of the plurality of interface elements to be separate rings within concentric rings. Element correspondence unit 2126 makes the particular interface element a particular ring within the concentric rings. Visual distinguishing unit 2110 visually distinguishes the particular interface element by highlighting the particular ring, presenting, without highlighting, one or more rings inside of the particular ring, and presenting, without highlighting, one or more rings of the concentric rings outside of the particular ring.

Contact detecting unit 2122 detects user interaction relative to the particular interface segment. In response to contact detecting unit 2122 detecting the user interaction, page indicating unit 2112 changes a currently active interface segment from the particular interface segment to a second interface segment of the plurality of interface segments. Page indicating unit 2112 updates the set of interface elements to indicate that the second interface segment has become the currently active interface segment. Page indicating unit 2112 makes the interface segments to be pages. Page indicating unit 2112 makes the currently active interface segment a currently active page. Contact detecting unit 2122 detects the user interaction as a swiping gesture.

Display enabling unit 2108 optionally includes a tab indicating unit 2128. Contact detecting unit 2122 detects user interaction relative to the particular interface segment. In response to contact detecting unit 2122 detecting the user interaction, tab indicating unit 2128 changes a currently active interface segment from the particular interface segment to a second interface segment of the plurality of interface segments. Tab indicating unit 2128 updates the set of interface elements to indicate that the second interface segment has become the currently active interface segment. Tab indicating unit 2128 makes the interface segments to be tabs. Tab indicating unit 2128 makes the currently active interface segment a currently active tab. Tab indicating unit 2128 causes one or more of the tabs other than the currently active tab to be at least partially obscured. Contact detecting unit 2122 detects the user interaction as user contact with input unit 2104 at a location corresponding to a position at which a tab is presented on display unit 2102.

Display enabling unit 2108 optionally includes an interface segment activation unit 2130. Contact detecting unit 2122 detects user contact with input unit 2104 at a location corresponding to a position at which the set of interface elements is presented on display unit 2102. In response to detecting the user contact, interface segment activation unit 2130 causes a second interface element other than the particular interface element to become the currently active interface element. Interface segment activation unit 2130 ceases to present the particular interface segment on display unit 2102. Interface segment activation unit 2130 presents, on display unit 2102, a second interface segment that corresponds to the second interface element.

Display enabling unit 2108 optionally includes an interface element activation unit 2132. Contact detecting unit 2122 detects that user contact has been maintained for at least a specified threshold amount of time. In response to contact detecting unit 2122 detecting that the user contact has been maintained for at least the specified threshold amount of time, interface element activation unit 2132 periodically changes the currently active interface element while the user contact is being maintained.

Contact detecting unit 2122 detects user contact as a single-tap gesture. In response to contact detecting unit 2122 detecting the single-tap gesture, interface element activation unit 2132 causes an interface element immediately inside of the particular interface element to become a new currently active interface element.

Contact detecting unit 2122 detects user contact as a double-tap gesture. In response to contact detecting unit 2122 detecting the double-tap gesture, interface element activation unit 2132 causes an interface element immediately outside of the particular interface element to become a new currently active interface element.

Display enabling 2108 optionally includes a segment correspondence unit 2134. Element correspondence unit 2126 makes interface elements in the set of interface elements sequentially related to each other. Interface element activation unit 2132 causes the second interface element to become the currently active interface element by causing a next interface element following the particular interface element in a sequence of interface elements to become the currently active interface element. Element correspondence unit 2126 makes an innermost interface element follow an outermost interface element in the sequence. Element correspondence unit 2126 makes the outermost interface element follow an innermost interface element in the sequence.

Display enabling 2108 optionally includes an expanding-collapsing unit 2136. Expanding-collapsing unit 2136 displays the set of interface elements by displaying the set of interface elements in a collapsed configuration in which a first interface element in the set at least partially overlaps a second interface element in the set and in which a plurality of the interface elements in the set are at least partially visible. Contact detecting unit 2122 detects user contact with input unit 2104 at a location that corresponds to a position at which the set of interface elements is presented on display unit 2102. In response to contact detecting unit 2122 detecting the user contact, expanding-collapsing unit 2136 expands the set of interface elements into an expanded configuration in which a plurality of interface elements that were at least partially overlapping each other no longer overlap each other.

Contact detecting unit 2122 detects cessation of the user contact with input unit 2104 at the location. In response to contact detecting unit 2122 detecting the cessation, expanding-collapsing unit 2136 collapses the set of interface elements back into the collapsed configuration.

Processing unit 2106 includes a drag gesture detecting unit 2138. Drag gesture detection unit 2138 detects a dragging gesture that drags contact from a first interface element in the expanded configuration to a second interface element in the expanded configuration. In response to drag gesture detection unit 2138 detecting the dragging gesture, interface element activation unit 2132 sets the second interface element to be the currently active interface element.

The above description of exemplary embodiments has been presented for the purposes of illustration and description. It is not intended to be exhaustive or to limit patent protection or scope to the precise form described, and many modifications and variations are possible in light of the teaching above. Embodiments discussed herein were chosen and described in order to best explain the principles and practical applications to thereby enable others skilled in the art to best utilize disclosed systems and techniques in various embodiments and with various modifications as are suited to the particular use contemplated.

What is claimed is:

1. A method comprising:
   displaying a set of interface elements that at least partially overlap each other, each interface element in the set of interface elements corresponding to a distinct interface segment in a sequence of interface segments, the sequence of interface segments including a first end segment and a second end segment at opposite ends of the sequence of interface segments, the set of interface elements including a single, particular interface element that indicates which particular interface segment, of the sequence of interface segments, is currently active and is being displayed;
   visually distinguishing the particular interface element from a remainder of the interface elements in the set, wherein interface segments in the sequence of interface segments other than the particular interface segment are currently inactive, wherein the interface segments other than the currently active interface segment are not displayed while the currently active interface segment is being displayed;
   detecting user interaction relative to the currently active interface segment; and
   in response to detecting the user interaction, making a next interface segment in the sequence of interface segments the currently active segment instead of the interface segment that was active when the user interaction was detected, displaying said next interface segment as the currently active interface segment, and updating the displayed set of interface elements to indicate which interface segment is the currently active interface segment wherein the interface segments other than the currently active interface segment are not displayed while the currently active interface segment is being displayed; and
   after detecting a first instance of the user interaction relative to the currently active interface segment and making the next interface segment the currently active interface segment, detecting a second instance of the user interaction relative to the currently active interface segment and, in response to detecting the second instance of the user interaction, making a further next interface segment in the sequence of interface segments the currently active interface segment;
   wherein,
   when the user interaction is a first predefined user interaction and the currently active interface segment is the first end segment, the next interface segment is the second end segment.

2. The method of claim 1, wherein a first interface element of the set of interface elements contains a second interface element of the set of interface elements, and wherein the particular interface segment is a particular page from a plurality of pages;
   wherein at least the particular interface segment and the next interface segment of the sequence of interface segments each comprise a plurality of application launch icons.

3. The method of claim 1,
   wherein the set of interface elements is a set of concentric rings and the particular interface element is a particular concentric ring from the set of concentric rings.

4. The method of claim 1, wherein the set of interface elements is a set of polygons in which a first polygon is displayed within a second polygon, and in which the second polygon is displayed within a third polygon.

5. The method of claim 1, wherein displaying the set of interface elements comprises displaying a non-overhead perspective view of the interface elements in the set of interface elements in which at least a first interface element in the set of interface elements has an appearance of being stacked on top of a second interface element in the set of interface elements; and further comprising:
   detecting user contact on a touch-sensitive surface at a location that corresponds to a position at which the perspective view of the interface elements in the set of interface elements is presented on a display;
   in response to detecting the user contact, changing the display from the perspective view to an overhead view in which the first interface element has an appearance of being contained within the second interface element;
   detecting a cessation of the user contact with the touch-sensitive surface at the location; and
   in response to detecting the cessation, changing the display from the overhead view back to the non-overhead perspective view.

6. The method of claim 1:
   wherein different interface elements of the set of interface elements correspond to different interface segments of the sequence of interface segments;
   wherein two or more interface elements of the set of interface elements are separate rings within concentric rings;
   wherein the particular interface element is a particular ring within the concentric rings; and wherein visually distinguishing the particular interface element comprises:
highlighting the particular ring,
highlighting one or more rings of the concentric rings within the particular ring, and
presenting, without highlighting, one or more rings of the concentric rings outside of the particular ring.

7. The method of claim 1:
wherein different interface elements of the set of interface elements correspond to different interface segments of the sequence of interface segments;
wherein two or more interface elements of the set of interface elements are separate rings within concentric rings;
wherein the particular interface element is a particular ring within the concentric rings; and
wherein visually distinguishing the particular interface element comprises:
highlighting the particular ring,
presenting, without highlighting, one or more rings inside of the particular ring, and
presenting, without highlighting, one or more rings of the concentric rings outside of the particular ring.

8. The method of claim 1:
wherein the sequence of interface segments is a plurality of pages;
wherein the currently active interface segment is a currently active page from the plurality of pages;
wherein the next interface segment is a page from the plurality of pages; and
wherein the user interaction is a swiping gesture.

9. The method of claim 1, further comprising:
detecting user contact with a touch-sensitive surface at a location that corresponds to a position at which the set of interface elements is presented on a display;
in response to detecting the user contact:
causing a second interface element from the set of interface elements other than the particular interface element to become active instead of the particular interface element,
ceasing to present the particular interface segment on the display, and
presenting, on the display, a second interface segment from the sequence of interface segments that corresponds to the second interface element.

10. The method of claim 9, further comprising:
detecting that the user contact has been maintained for at least a specified threshold amount of time; and
in response to detecting that the user contact has been maintained for at least the specified threshold amount of time, periodically changing which interface element from the set of interface elements is active while the user contact is being maintained.

11. The method of claim 9, wherein the user contact comprises a single-tap gesture, the method further comprising:
in response to the single-tap gesture, causing an interface element immediately inside of the particular interface element to become active instead of the particular interface element.

12. The method of claim 9, wherein the user contact comprises a double-tap gesture, the method further comprising:
in response to the double-tap gesture, causing an interface element immediately outside of the particular interface element to become active instead of the particular interface element.

13. The method of claim 9:
wherein the interface elements in the set of interface elements are sequentially related to each other;
wherein causing the second interface element to become the currently active interface element comprises causing a next interface element following the particular interface element in a sequence of interface elements to become the currently active interface element;
wherein an innermost interface element follows an outermost interface element in the sequence; and
wherein the outermost interface element follows an innermost interface element in the sequence.

14. The method of claim 9, wherein displaying the set of interface elements comprises displaying the set of interface elements in a collapsed configuration in which a first interface element in the set of interface elements at least partially overlaps a second interface element in the set of interface elements and in which a plurality of the interface elements in the set of interface elements are at least partially visible, the method further comprising:
detecting user contact with a touch-sensitive surface at a location that corresponds to a position at which the set of interface elements is presented on a display; and
in response to detecting the user contact, expanding the set of interface elements into an expanded configuration in which interface elements in the plurality of interface elements that were at least partially overlapping each other no longer overlap each other.

15. The method of claim 14, further comprising:
detecting cessation of the user contact with the display at the location; and
in response to detecting the cessation, collapsing the set of interface elements back into the collapsed configuration.

16. The method of claim 14, further comprising:
detecting a dragging gesture that drags contact from a position corresponding to a location of a first interface element of the set of interface elements in the expanded configuration to a position corresponding to a location of a second interface element of the set of interface elements in the expanded configuration; and
in response to detecting the dragging gesture, making the second interface element active.

17. A non-transitory computer-readable storage medium storing a set of instructions that are executable by one or more processors to cause the one or more processors to perform operations comprising:
displaying a set of interface elements comprising interface elements that at least partially overlap each other, each interface element in the set of interface elements corresponding to a distinct interface segment in a sequence of interface segments, the sequence of interface segments including a first end segment and a second end segment at opposite ends of the sequence of interface segments, the set of interface elements including a single, particular interface element that indicates which particular interface segment, of the sequence of interface segments, is currently active and is being displayed;
visually distinguishing the particular interface element from a remainder of the interface elements in the set of interface elements, wherein interface segments in the sequence of interface segments other than the particular interface segment are currently inactive, wherein the interface segments other than the currently active interface segment are not displayed while the currently active interface segment is being displayed;

detecting user interaction relative to the currently active interface segment; and in response to detecting the user interaction, making a next interface segment in the sequence of interface segments the currently active segment instead of the interface segment that was active when the user interaction was detected, displaying said next interface segment as the currently active interface segment, and updating the displayed set of interface elements to indicate which interface segment is the currently active interface segment wherein the interface segments other than the currently active interface segment are not displayed while the currently active interface segment is being displayed; and after detecting a first instance of the user interaction relative to the currently active interface segment and making the next interface segment the currently active interface segment, detecting a second instance of the user interaction relative to the currently active interface segment and, in response to detecting the second instance of the user interaction, making a further next interface segment in the sequence of interface segments the currently active interface segment;

wherein, when the user interaction is a first predefined user interaction and the currently active interface segment is the first end segment, the next interface segment is the second end segment.

18. A system comprising:

one or more processors;

a display driven by the one or more processors; and a storage memory that stores instructions for causing the one or more processors to perform operations comprising:

displaying a set of interface elements comprising interface elements that at least partially overlap each other, each interface element in the set of interface elements corresponding to a distinct interface segment in a sequence of interface segments, the sequence of interface segments including a first end segment and a second end segment at opposite ends of the sequence of interface segments, the set of interface elements including a single, particular interface element that indicates which particular interface segment, of the sequence of interface segments, is currently active and is being displayed;

visually distinguishing the particular interface element from a remainder of the interface elements in the set, wherein interface segments in the sequence of interface segments other than the particular interface segment are currently inactive, wherein the interface segments other than the currently active interface segment are not displayed while the currently active interface segment is being displayed;

detecting user interaction relative to the currently active interface segment; and in response to detecting the user interaction, making a next interface segment in the sequence of interface segments the currently active segment instead of the interface segment that was active when the user interaction was detected, displaying said next interface segment as the currently active interface segment, and updating the displayed set of interface elements to indicate which interface segment is the currently active interface segment wherein the interface segments other than the currently active interface segment are not displayed while the currently active interface segment is being displayed; and after detecting a first instance of the user interaction relative to the currently active interface segment and making the next interface segment the currently active interface segment, detecting a second instance of the user interaction relative to the currently active interface segment and, in response to detecting the second instance of the user interaction, making a further next interface segment in the sequence of interface segments the currently active interface segment wherein, when the user interaction is a first predefined user interaction and the currently active interface segment is the first end segment, the next interface segment is the end segment.

19. The method of claim 1, wherein, when the user interaction is a second predefined user interaction and the particular interface segment is the second end segment, the next interface segment is the first end segment.

20. The method of claim 1, wherein the set of interface elements comprise a set of concentric elements, each concentric element in the set of interface elements corresponding to a distinct interface segment in the sequence of interface segments.

21. The system of claim 19, wherein a first interface element of the set of interface elements contains a second interface element of the set of interface elements, and wherein the particular interface segment is a particular page from a plurality of pages;

wherein at least the particular interface segment and the next interface segment of the sequence of interface segments each comprise a plurality of application launch icons.

22. The system of claim 19, wherein the set of interface elements is a set of concentric rings and the particular interface element is a particular concentric ring from the set of concentric rings.

23. The system of claim 19, wherein the set of interface elements is a set of polygons in which a first polygon is displayed within a second polygon, and in which the second polygon is displayed within a third polygon.

24. The system of claim 19, wherein displaying the set of interface elements comprises displaying a non-overhead perspective view of the interface elements in the set of interface elements in which at least a first interface element in the set of interface elements has an appearance of being stacked on top of a second interface element in the set of interface elements; and the storage memory stores instructions for causing the one or more processors to perform operations further comprising:

detecting user contact on a touch-sensitive surface at a location that corresponds to a position at which the perspective view of the interface elements in the set of interface elements is presented on a display;

in response to detecting the user contact, changing the display from the perspective view to an overhead view in which the first interface element has an appearance of being contained within the second interface element;

detecting a cessation of the user contact with the touch-sensitive surface at the location; and in response to detecting the cessation, changing the display from the overhead view back to the non-overhead perspective view.

25. The system of claim 19, wherein:

the sequence of interface segments is a plurality of pages;

the currently active interface segment is a currently active page from the plurality of pages;
the next interface segment is a page from the plurality of pages; and
the user interaction is a swiping gesture.

26. The system of claim 19, wherein the storage memory stores instructions for causing the one or more processors to perform operations further comprising:
   detecting user contact with a touch-sensitive surface at a location that corresponds to a position at which the set of interface elements is presented on a display;
   in response to detecting the user contact:
   causing a second interface element from the set of interface elements other than the particular interface element to become active instead of the particular interface element,
   ceasing to present the particular interface segment on the display, and
   presenting, on the display, a second interface segment from the sequence of interface segments that corresponds to the second interface element.

27. The system of claim 19, wherein the set of interface elements comprise a set of concentric elements, each concentric element in the set of interface elements corresponding to a distinct interface segment in the sequence of interface segments.

28. The non-transitory computer-readable storage medium of claim 18, wherein a first interface element of the set of interface elements contains a second interface element of the set of interface elements, and wherein the particular interface segment is a particular page from a plurality of pages;
   wherein at least the particular interface segment and the next interface segment of the sequence of interface segments each comprise a plurality of application launch icons.

29. The non-transitory computer-readable storage medium of claim 18,
   wherein the set of interface elements is a set of concentric rings and the particular interface element is a particular concentric ring from the set of concentric rings.

30. The non-transitory computer-readable storage medium of claim 18, wherein the set of interface elements is a set of polygons in which a first polygon is displayed within a second polygon, and in which the second polygon is displayed within a third polygon.

31. The non-transitory computer-readable storage medium of claim 18, wherein displaying the set of interface elements comprises displaying a non-overhead perspective view of the interface elements in the set of interface elements in which at least a first interface element in the set of interface elements has an appearance of being stacked on top of a second interface element in the set of interface elements; and the storage memory stores instructions for causing the one or more processors to perform operations further comprising:
   detecting user contact on a touch-sensitive surface at a location that corresponds to a position at which the perspective view of the interface elements in the set of interface elements is presented on a display;
   in response to detecting the user contact, changing the display from the perspective view to an overhead view in which the first interface element has an appearance of being contained within the second interface element;
   detecting a cessation of the user contact with the touch-sensitive surface at the location; and
   in response to detecting the cessation, changing the display from the overhead view back to the non-overhead perspective view.

32. The non-transitory computer-readable storage medium of claim 18, wherein:
   the sequence of interface segments is a plurality of pages;
   the currently active interface segment is a currently active page from the plurality of pages;
   the next interface segment is a page from the plurality of pages; and
   the user interaction is a swiping gesture.

33. The non-transitory computer-readable storage medium of claim 18, wherein the storage memory stores instructions for causing the one or more processors to perform operations further comprising:
   detecting user contact with a touch-sensitive surface at a location that corresponds to a position at which the set of interface elements is presented on a display;
   in response to detecting the user contact:
   causing a second interface element from the set of interface elements other than the particular interface element to become active instead of the particular interface element,
   ceasing to present the particular interface segment on the display, and
   presenting, on the display, a second interface segment from the sequence of interface segments that corresponds to the second interface element.

34. The non-transitory computer-readable storage medium of claim 18, wherein the set of interface elements comprise a set of concentric elements, each concentric element in the set of interface elements corresponding to a distinct interface segment in the sequence of interface segments.

* * * * *

UNITED STATES PATENT AND TRADEMARK OFFICE
CERTIFICATE OF CORRECTION

| | | |
|---|---|---|
| PATENT NO. | : 10,133,454 B2 | Page 1 of 1 |
| APPLICATION NO. | : 14/503131 | |
| DATED | : November 20, 2018 | |
| INVENTOR(S) | : Wilson et al. | |

It is certified that error appears in the above-identified patent and that said Letters Patent is hereby corrected as shown below:

In the Abstract, Line 8, please delete "can be appear" and insert --can appear--.

Signed and Sealed this
Fifth Day of February, 2019

Andrei Iancu
*Director of the United States Patent and Trademark Office*